United States Patent
Izumi

(10) Patent No.: US 9,174,638 B2
(45) Date of Patent: Nov. 3, 2015

(54) CONTROL APPARATUS FOR HYBRID VEHICLE

(71) Applicant: Junta Izumi, Nagoya (JP)

(72) Inventor: Junta Izumi, Nagoya (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 50 days.

(21) Appl. No.: 13/744,669

(22) Filed: Jan. 18, 2013

(65) Prior Publication Data
US 2013/0190958 A1  Jul. 25, 2013

(30) Foreign Application Priority Data

Jan. 20, 2012  (JP) ................................. 2012-009689

(51) Int. Cl.
| B60W 20/00 | (2006.01) |
| B60W 10/06 | (2006.01) |
| B60W 10/08 | (2006.01) |
| B60K 6/442 | (2007.10) |
| B60K 6/445 | (2007.10) |
| B60W 10/26 | (2006.01) |

(52) U.S. Cl.
CPC ............... *B60W 20/20* (2013.01); *B60K 6/442* (2013.01); *B60K 6/445* (2013.01); *B60W 10/06* (2013.01); *B60W 10/08* (2013.01); *B60W 10/26* (2013.01); *B60W 20/106* (2013.01); *B60W 2510/242* (2013.01); *B60W 2510/244* (2013.01); *B60W 2600/00* (2013.01); *B60Y 2400/214* (2013.01); *Y02T 10/6239* (2013.01); *Y02T 10/6286* (2013.01); *Y02T 10/7258* (2013.01); *Y10S 903/93* (2013.01)

(58) Field of Classification Search
None
See application file for complete search history.

(56) References Cited

U.S. PATENT DOCUMENTS

| 5,675,258 | A | 10/1997 | Kadouchi et al. |
| 6,453,249 | B1 | 9/2002 | Shibutani et al. |
| 8,560,153 | B2 * | 10/2013 | Nefcy et al. ..................... 701/22 |
| 8,560,155 | B2 * | 10/2013 | Kedar-Dongarkar et al. .. 701/22 |
| 8,571,739 | B2 * | 10/2013 | Fleckner et al. ................ 701/22 |
| 8,718,849 | B2 * | 5/2014 | Yamamoto et al. ............. 701/22 |
| 2012/0016547 | A1 * | 1/2012 | Aridome et al. ................ 701/22 |
| 2013/0062941 | A1 | 3/2013 | Yamamoto et al. |
| 2013/0132011 | A1 | 5/2013 | Mano et al. |

FOREIGN PATENT DOCUMENTS

| JP | 08-138759 A | 5/1996 |
| JP | 2000-224701 A | 8/2000 |
| JP | 2011-064571 A | 3/2011 |
| JP | 2011-069693 A | 4/2011 |
| JP | 2011-240863 A | 12/2011 |
| WO | 2011145213 A1 | 11/2011 |
| WO | WO2011161816 | * 12/2011 |

* cited by examiner

*Primary Examiner* — John R Olszewski
*Assistant Examiner* — James M McPherson
(74) *Attorney, Agent, or Firm* — Dinsmore & Shohl LLP

(57) ABSTRACT

A control apparatus for a hybrid vehicle includes a drive mode control portion and a battery degradation determination portion. The chive mode control portion sets the drive mode to a CD mode after the charging of a battery by a battery charger ends as the state of charge of the battery reaches a first predetermined range. The drive mode control portion switches the drive mode to a CS mode if, after the hybrid vehicle starts driving in the CD mode, the state of charge of the battery declines to a second predetermined range that is lower than the first predetermined range. The battery degradation determination portion performs determination regarding degradation of the battery on the basis of data collected while the vehicle is driving.

17 Claims, 26 Drawing Sheets

|  |  | TIME RANGE | | |
|---|---|---|---|---|
|  |  | B1 | B2 | B3 |
| TEMPERATURE RANGE | A1 | C11 | C12 | C13 |
|  | A2 | C21 | C22 | C23 |
|  | A3 | C31 | C32 | C33 |

FIG.7

| TIME RANGE | LEARNED INTEGRATED ELECTRIC POWER VALUE |
|---|---|
| B1 | D1 |
| B2 | D2 |
| B3 | D3 |

| AVERAGE VEHICLE SPEED | INITIAL STANDARD TRAVEL DISTANCE |
|---|---|
| E1 | F1 |
| E2 | F2 |
| E3 | F3 |

| AVERAGE ACCELERATION | TRAVEL DISTANCE INCREASE/DECREASE VALUE |
|---|---|
| G1 | H1 |
| G2 | H2 |
| G3 | H3 |

FIG. 17

|  |  | ELECTRIC POWER RANGE | | |
|---|---|---|---|---|
|  |  | I1 | I2 | I3 |
| TEMPERATURE RANGE | A1 | J11 | J12 | J13 |
|  | A2 | J21 | J22 | J23 |
|  | A3 | J31 | J32 | J33 |

FIG. 20

| CURRENT RANGE | TOTAL AMOUNT OF TIME |
|---|---|
| R1 | M1 |
| R2 | M2 |
| R3 | M3 |

FIG. 21

| CURRENT RANGE | DEGRADATION COEFFICIENT |
|---|---|
| R1 | L1 |
| R2 | L2 |
| R3 | L3 |

FIG. 22

| CURRENT RANGE | DEGREE OF DEGRADATION |
|---|---|
| R1 | N1 |
| R2 | N2 |
| R3 | N3 |

FIG. 23

|  | FOR TRAVELING STATE | FOR CHARGING STATE | FOR LEFT-STANDING STATE |
|---|---|---|---|
| CURRENT FREQUENCY PRODUCT | K1 | K2 | K3 |
| CURRENT SQUARED FREQUENCY PRODUCT | K4 | K5 | K6 |
| TEMPERATURE FREQUENCY PRODUCT | K7 | K8 | K9 |
| SOC FREQUENCY PRODUCT | K10 | K11 | K12 |

F I G . 26

| CURRENT RANGE | FREQUENCY OF OCCURRENCE | DAMAGE COEFFICIENT | DEGRADATION POINT |
|---|---|---|---|
| R1 | O1 | P1 | Q1 |
| R2 | O2 | P2 | Q2 |
| R3 | O3 | P3 | Q3 |

CONTROL APPARATUS FOR HYBRID VEHICLE

INCORPORATION BY REFERENCE

The disclosure of Japanese Patent Application No. 2012-009689 filed on Jan. 20, 2012 including the specification, drawings and abstract is incorporated herein by reference in its entirety.

BACKGROUND OF THE INVENTION

1. Field of the Invention

The invention relates to a control apparatus for a hybrid vehicle and, more particularly, to a control apparatus that detects degradation of an electrical storage apparatus mounted in a hybrid vehicle.

2. Description of Related Art

Hybrid vehicles that drive by drive force from an electric motor have a battery for storing electric power that is to be supplied to the electric motor. The battery capacity declines from full charge capacity of an initial state by various factors, including the current, voltage, temperature and SOC of the battery as well as the elapsed time, etc. . . . . In order to determine when to replace the battery due to degradation, it is necessary to precisely detect the decline in the full charge capacity.

Japanese Patent Application Publication No. 2000-224701 (JP 2000-224701 A) discloses a degradation determination apparatus for a battery that is mounted in a hybrid vehicle. The degradation determination apparatus integrates the output current of the battery and also the regenerative current stored into the battery during the period from when the battery charge is at an upper limit until when it reaches a lower limit. This degradation determination apparatus performs the determination regarding degradation of the battery by comparing the integrated value of current with a pre-set degradation criterion value (see (JP 2000-224701 A).

However, in the hybrid vehicles as described above, it is rare that the battery charge changes from the upper limit to the lower limit. Therefore, there is possibility that the occurrence frequency of performing the detection of degradation of the battery may become inconveniently low.

SUMMARY OF THE INVENTION

Accordingly, the invention provides a control apparatus that frequently and accurately detects the degradation of an electrical storage apparatus mounted in a hybrid vehicle.

According to the first aspect of the invention, a hybrid vehicle includes an internal combustion engine, an electrical storage apparatus, at least one electric motor, and a charger apparatus. The electric motor has an electricity generation function of being driven by the internal combustion engine so as to supply electric power to the electrical storage apparatus, and a function of generating drive force. The charger apparatus is configured so as to be supplied with electric power from an electric power supply provided outside the hybrid vehicle and charge the electrical storage apparatus. The hybrid vehicle is able to drive with at least two drive modes that include a first mode and a second mode. In the first mode, priority is given to a driving with the internal combustion engine stopped and with only the electric motor used as a drive force source of the hybrid vehicle. In the second mode, the internal combustion engine is operated and a state quantity that indicates state of charge of the electrical storage apparatus is kept at a predetermined target. The control apparatus of the hybrid vehicle includes a drive mode control portion and a determination portion. The drive mode control portion sets the drive mode to the first mode after charging of the electrical storage apparatus by the charger apparatus ends as the state of charge of the electrical storage apparatus reaches a first predetermined range. The drive mode control portion switches the drive mode to the second mode if, after the hybrid vehicle starts driving in the first mode, the state of charge of the electrical storage apparatus declines to a second predetermined range that is lower than the first predetermined range. The determination portion performs determination regarding degradation of the electrical storage apparatus based on data collected while the hybrid vehicle is driving in the first mode.

In the above-described construction, the first predetermined range of the state of charge may include a fully charged state of the electrical storage apparatus. Furthermore, the determination portion may perform the determination regarding degradation of the electrical storage apparatus based on data collected from when the electrical storage apparatus is in the fully charged state until when the drive mode is switched from the first mode to the second mode.

In the foregoing construction, the data may be an integrated current value obtained by integrating input/output current of the electrical storage apparatus from when the electrical storage apparatus is in the fully charged state until when the drive mode is switched from the first mode to the second mode.

Furthermore, in the forgoing construction, the determination portion may perform the determination regarding degradation of the electrical storage apparatus based on amount of decline of the integrated current value from an initial integrated current value measured during an initial state occurring before the electrical storage apparatus degrades.

In the foregoing construction, the data may be an integrated electric power value obtained by integrating input/output electric power of the electrical storage apparatus from when the electrical storage apparatus is in the fully charged state until when the drive mode is switched from the first mode to the second mode.

Furthermore, in the foregoing construction, the determination portion may perform the determination regarding degradation of the electrical storage apparatus based on amount of decline of the integrated electric power value from an initial integrated electric power value measured during an initial state occurring before the electrical storage apparatus degrades.

In the foregoing construction, the data may be drive distance that the hybrid vehicle drives from when the electrical storage apparatus is in the fully charged state until when the drive mode is switched from the first mode to the second mode.

Furthermore, in the foregoing construction, the determination portion may perform the determination regarding degradation of the electrical storage apparatus based on amount of decline of the travel distance from an initial travel distance measured during an initial state occurring before the electrical storage apparatus degrades.

In the foregoing construction, the determination portion may perform the determination regarding degradation of the electrical storage apparatus based on the data commensurate with temperature of the electrical storage apparatus.

In the foregoing construction, the determination portion may perform the determination regarding degradation of the electrical storage apparatus based on the data commensurate with time of drive in the first mode.

In the foregoing construction, the determination portion may continue the determination regarding degradation of the electrical storage apparatus if the internal combustion engine operates while the drive mode is the first mode.

In the foregoing construction, the determination portion may stop the determination regarding degradation of the electrical storage apparatus if the internal combustion engine operates while the drive mode is the first mode.

According to a second aspect of the invention, a control method for a hybrid vehicle includes the following steps. The drive mode is set to the first mode after charging of the electrical storage apparatus by the charger apparatus ends as the state of charge of the electrical storage apparatus reaches a first predetermined range. Then, the drive mode is switched to the second mode if, after the hybrid vehicle starts driving in the first mode, the state of charge of the electrical storage apparatus declines to a second predetermined range that is lower than the first predetermined range. Determination regarding degradation of the electrical storage apparatus is performed based on data collected while the hybrid vehicle is driving in the first mode.

In the above-described construction, the first predetermined range of the state of charge may include a fully charged state of the electrical storage apparatus. Furthermore, in the control method, the determination regarding degradation of the electrical storage apparatus may be performed based on data collected from when the electrical storage apparatus is in the fully charged state until when the drive mode is switched from the first mode to the second mode.

In the foregoing construction, the data may be an integrated current value obtained by integrating input/output current of the electrical storage apparatus from when the electrical storage apparatus is in the fully charged state until when the drive mode is switched from the first mode to the second mode. At this time, the determination regarding degradation of the electrical storage apparatus may be performed based on amount of decline of the integrated current value from an initial integrated current value measured during an initial state occurring before the electrical storage apparatus degrades.

Furthermore, in the foregoing construction, the data may be an integrated electric power value obtained by integrating input/output electric power of the electrical storage apparatus from when the electrical storage apparatus is in the fully charged state until when the drive mode is switched from the first mode to the second mode. The determination regarding degradation of the electrical storage apparatus may be performed based on amount of decline of the integrated electric power value from an initial integrated electric power value measured during an initial state occurring before the electrical storage apparatus degrades.

In the foregoing construction, the data may be travel distance that the hybrid vehicle drives from when the electrical storage apparatus is in the fully charged state until when the drive mode is switched from the first mode to the second mode. In this case, the determination regarding degradation of the electrical storage apparatus may be performed based on amount of decline of the travel distance from an initial travel distance measured during an initial state occurring before the electrical storage apparatus degrades.

In the foregoing aspect of the invention, the drive mode control portion sets the drive mode to the first mode after the charging of the electrical storage apparatus by the charger apparatus ends as the state of charge of the electrical storage apparatus reaches the first predetermined range. The determination portion performs the determination regarding degradation of the electrical storage apparatus on the basis of the data collected while the hybrid vehicle is driving in the first mode. Due to this, when the electrical storage apparatus is charged with electric power supplied from an electric power supply provided outside the hybrid vehicle, the determination regarding degradation of the electrical storage apparatus can be started. Hence, opportunities of performing the determination regarding degradation of the electrical storage apparatus can be secured. Furthermore, the drive mode control portion switches the drive mode to the second mode if, after the hybrid vehicle starts driving in the first mode, the state of charge of the electrical storage apparatus declines to the second predetermined range that is lower than the first predetermined range. Due to this, the first mode is maintained until the state of charge of the electrical storage apparatus declines to the second predetermined range that is lower than the first predetermined range. Hence, a range of the state of charge of the electrical storage apparatus for collecting data for use for the determination regarding degradation can be secured. Therefore, according to the invention, it is possible to provide a control apparatus that accurately and highly frequently detects degradation of the electrical storage apparatus mounted in the hybrid vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a table that illustrates learned integrated electric current values that are stored in a memory by the control apparatus according to the second embodiment of the invention;

FIG. 17 is a table that illustrates learned charging time values that are stored into a memory by the control apparatus according to the fourth embodiment of the invention;

FIG. 20 is a table that illustrates total amounts of time that are stored into a memory by the control apparatus according to the fifth embodiment of the invention;

FIG. 21 is a table that illustrates degradation coefficient that are stored into the memory by the control apparatus according to the fifth embodiment of the invention;

FIG. 22 is a table that illustrates degrees of degradation that are stored into the memory by the control apparatus according to the fifth embodiment of the invention;

FIG. 23 is another table that illustrates degrees of degradation that are stored into the memory by the control apparatus according to the fifth embodiment of the invention;

FIG. 26 is a table that illustrates degradation points that are stored into the memory by the control apparatus according to the modification of the fifth embodiment of the invention.

DETAILED DESCRIPTION OF EMBODIMENTS

Figure 1:
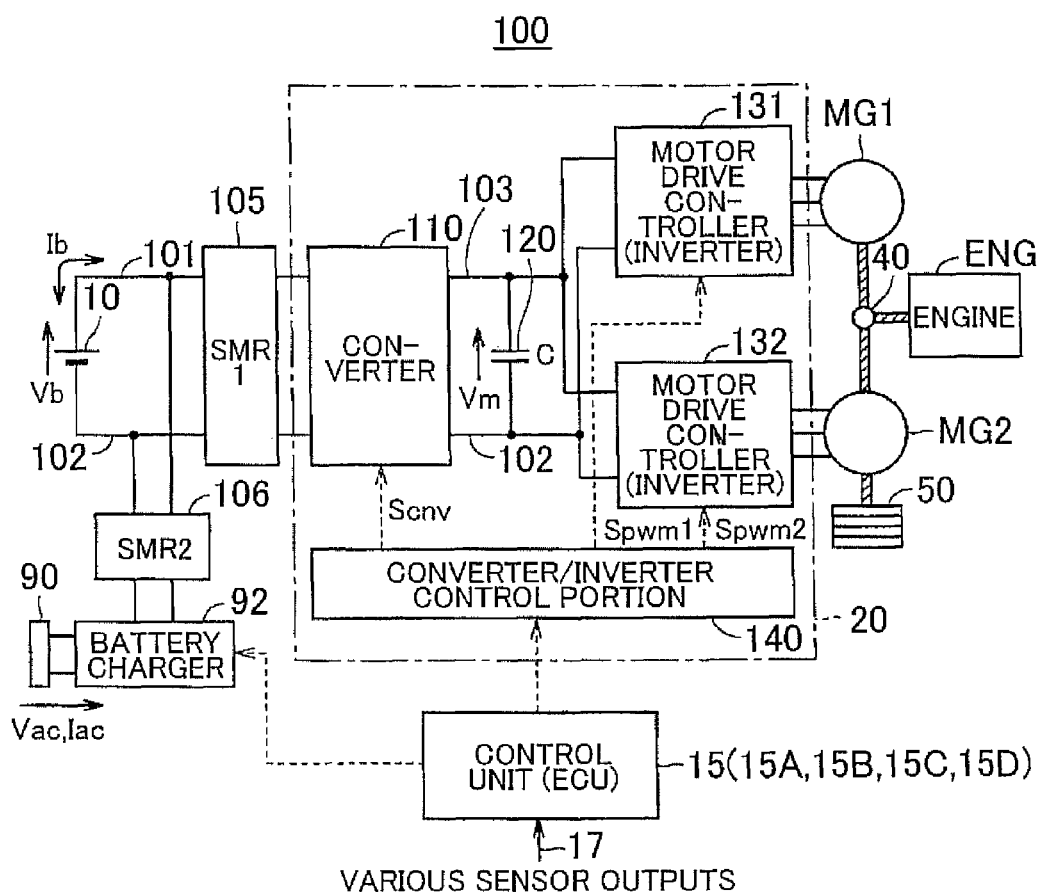
FIG. 1 is a block diagram showing an overall construction of a hybrid vehicle to which a control apparatus according to a first embodiment of the invention is applied.

Embodiments of the invention will be described in detail hereinafter with reference to the drawings. The same or comparable portions in the drawings are denoted by the same reference characters, and descriptions of those portions will not be repeated.

First Embodiment

FIG. 1 is a block diagram showing an overall construction of a hybrid vehicle to which a control apparatus according to a first embodiment of the invention is applied. Referring to FIG. 1, a hybrid vehicle 100 includes a battery 10, a control apparatus 15, a PCU (Power Control Unit) 20, motor-generators MG1 and MG2, an engine ENG, a differential gear (hereinafter, also referred to as "DG") 40, and a driving wheel 50. Furthermore, the hybrid vehicle 100 further includes a charger inlet 90, a battery charger 92 and SMRs (System Main Relays) 105 and 106. In the description below, the control apparatus 15 will also be referred to as "ECU (Electronic Control Unit) 15".

The battery 10 is a rechargeable direct-current power supply, and is made up of, for example, a secondary battery such as a nickel metal hydride battery, a lithium-ion battery, etc. The battery 10 is electrically connected to the PCU 20, and supplies the PCU 20 with direct-current voltage. Furthermore, the battery 10 is charged by receiving from the PCU 20 electric power that is generated by the motor-generators MG1 and MG2. The battery 10 is also charged by the battery charger 92, which receives electric power from an electric power supply provided outside the vehicle which is connected to a charger inlet 90. In the description below, the electric power supply outside the vehicle will also be referred to as "external electric power supply", and the charging of the battery from the external electric power supply will also be referred to as "external charging".

The PCU 20 comprehensively represents an electric power converter apparatus that is needed in the hybrid vehicle 100. The PCU 20 includes a converter 110 that boosts the voltage supplied from the battery 10, inverters 131 and 132 that drive the motor-generators, etc.

The ECU 15 receives various sensor outputs 17 from various sensors which indicate the status of vehicle driving and the status of the vehicle. The various sensor outputs 17 include the accelerator operation amount commensurate with the amount of depression of an accelerator pedal, the vehicle speed commensurate with the wheel rotation speeds, etc. Then, the ECU 15 executes various controls on the hybrid vehicle 100 on the basis of these sensor outputs that are input to the ECU 15.

Each of the motor-generators MG1 and MG2 is an alternating-current electric motor and, for example, a permanent magnet type synchronous electric motor that has a rotor in which permanent magnets are embedded. The motor-generators MG1 and MG2 are linked to the DG 40. The DG 40 includes a planetary gear (not shown). The planetary gear includes, although not shown, a sun gear, pinions, a carrier and a ring gear. The pinions mesh with the sun gear and the ring gear. The carrier supports the pinions rotatably about their axes, and is linked to a crankshaft (not shown) of the engine ENG. The sun gear is linked to a rotating shaft of the motor-generator MG1. The ring gear is linked to a rotating shaft of the motor-generator MG2 and to the driving wheel 50. Due to the DG 40, the motive power that the engine ENG generates is split into power on a path of transfer to the driving wheel 50 and power on a path of transfer to the motor-generator MG1.

The motor-generator MG1 generates electricity by using the motive power of the engine ENG split by the DG 40. For example, if the SOC (State Of Charge), which indicates the state of charge of the battery 10, declines, the engine ENG is started so that the motor-generator MG1 generates electricity. Then, the electric power thus generated is supplied to the battery 10.

On the other hand, the motor-generator MG2 generates drive force by using at least one of the electric power supplied from the battery 10 and the electric power generated by the motor-generator MG1. The drive force from the motor-generator MG2 is transferred to the driving wheel 50. Incidentally, when the vehicle is braking, the kinetic energy of the vehicle is transferred from the driving wheel 50 to the motor-generator MG2, so that the motor-generator MG2 is driven to operate as an electricity generator. Thus, the motor-generator MG2 operates a regenerative brake that recovers kinetic energy of the vehicle by converting it into electric power.

The charger inlet 90 is constructed so that a charging cable (not shown) connected to an external electric power supply can be connected to the charger inlet 90. Then, when external charging is performed, the charger inlet 90 receives electric power from the external electric power supply connected to the charger inlet 90, and supplies the electric power to the battery charger 92.

The battery charger 92 is provided between the charger inlet 90 and the battery 10, and converts the electric power supplied from the external electric power supply connected to the charger inlet 90 to a voltage level of the battery 10, and outputs the converted electric power to the battery 10.

The SMR 105 is provided between the battery 10 and the PCU 20, and is closed according to a command from the ECU 15 during the driving of the vehicle, or the like. The SMR 106 is provided between the battery 10 and the battery charger 92, and is closed according to a command from the ECU 15 at the time of external charging.

The PCU 20, in accordance with a control command from the ECU 15, boosts the direct-current voltage received from the battery 10, and converts the boosted direct-current voltage into alternating-current voltage to drive the motor-generators MG1 and MG2. Furthermore, at the time of regenerative operation of the motor-generators MG1 and MG2, the PCU 20 converts the alternating-current voltage generated by the motor-generators MG1 and MG2 into direct-current voltage, and charges the battery 10 with the converted direct-current voltage, in accordance with a control command from the ECU 15.

The PCU 20 includes a converter 110, a capacitor 120, motor drive controllers 131 and 132, and a converter/inverter control portion 140. The motor drive controllers 131 and 132 are each constructed of an inverter. In the description below, the motor drive controller 131 (132) will also be referred to as "inverter 131 (132)".

The converter 110 boosts the voltage Vm between the positive pole wire 103 and the negative pole wire 102 to or above the voltage Vb of the battery 10 on the basis of a control signal Scnv from the converter/inverter control portion 140. The converter 110 is constructed by, for example, a current-reversible-type boost chopper circuit.

The inverters 131 and 132 are provided corresponding to the motor-generators MG1 and MG2, respectively. The inverters 131 and 132 are connected to the converter 110 in parallel with each other, and drive the motor-generators MG1 and MG2 on the basis of control signals Spwm1 and Spwm2, respectively, that are sent from the converter/inverter control portion 140.

The converter/inverter control portion 140 generates control signals Scnv, Spwm1 and Spwm2 for driving the converter 110 and the motor-generators MG1 and MG2, respectively, on the basis of control command values from the ECU 15 (a target value of the voltage Vm, torque target values for the motor-generators MG1 and MG2, etc.). Then, the converter/inverter control portion 140 outputs the generated control signals Scnv, Spwm1 and Spwm2 to the converter 110 and the inverters 131 and 132.

The ECU 15 performs various controls, including a control of the drive mode of the hybrid vehicle 100, determination as to whether to start/stop the engine ENG, a charging/discharging control, etc., on the basis of various sensor outputs 17. Then, the ECU 15 generates a control command value for driving the PCU 20, and outputs the generated control command value to the converter/inverter control portion 140 of the PCU 20. Furthermore, the ECU 15, at the time of external charging, generates a signal for driving the battery charger 92, and outputs the generated signal to the battery charger 92. Still further, the ECU 15 determines whether the battery 10 has degraded.

Figure 2:
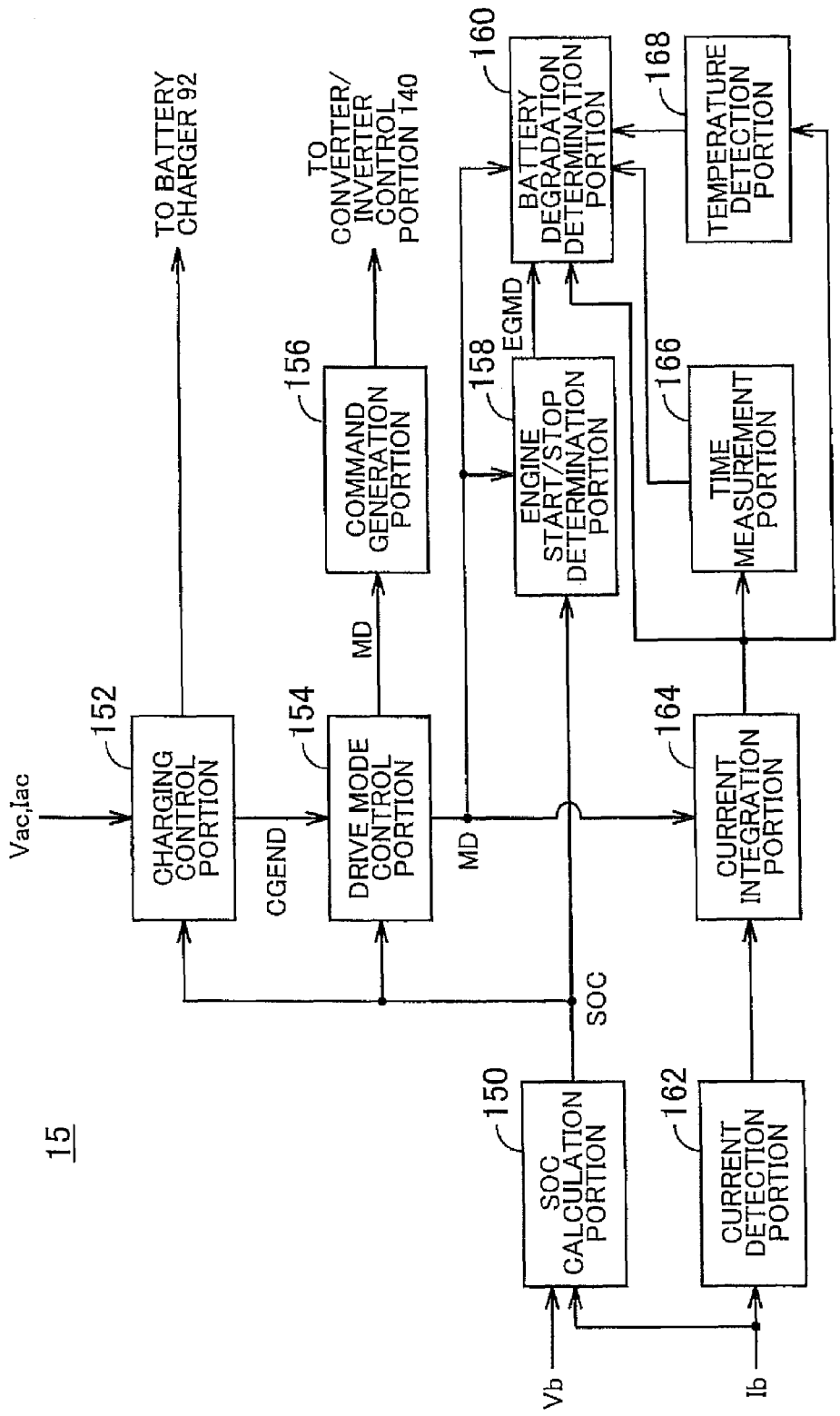
FIG. 2 is a functional diagram of a control apparatus according to the first embodiment of the invention.

FIG. 2 is a functional block diagram of the ECU 15 shown in FIG. 1. Referring to FIG. 2, the ECU 15 includes an SOC calculation portion 150, a charging control portion 152, a drive mode control portion 154, a command generation portion 156, and an engine start/stop determination portion 158. The ECU 15 further includes a battery degradation determination portion 160, a current detection portion 162, a current integration portion 164, a time measurement portion 166, and a temperature detection portion 168.

The SOC calculation portion 150 calculates the SOC of the battery 10 on the basis of the voltage Vb and the current Ib of the battery 10 detected by sensors (not shown). The SOC represents the amount of stored electricity relative to the fully charged state of the battery 10 in the percentage of 0% to 100%, indicating the state of charge of the battery 10 (the remaining amount of stored electricity). With regard to the method of calculating the SOC, various known techniques can be used.

The drive mode control portion 154 controls the switching of the drive mode of the vehicle on the basis of the SOC calculated by the SOC calculation portion 150. Concretely, the drive mode control portion 154 controls the switching between a CD (Charge Depleting) mode in which priority is given to the driving of the vehicle in which the engine ENG is stopped and only the motor-generator MG2 is used as a drive force source of the vehicle and a CS (Charge Sustaining) mode in which the engine ENG is operated and the SOC of the battery 10 is kept at a predetermined target.

Incidentally, in the CD mode, operation of the engine ENG is permitted in the case when a driver of the vehicle greatly depresses the accelerator pedal, the case when an engine-driven-type air conditioner is in operation, the case when the engine is being warmed up, etc. The CD mode is a drive mode in which, basically, the electric power stored in the battery 10 is used as an energy source to run the vehicle without maintaining the SOC of the battery 10. During the CD mode, it is often the case that a relatively higher proportion of charging than of discharging as a result. On the other hand, the CS mode is a drive mode in which the engine ENG is operated according to need and electricity is generated by the motor-generator MG1 in order to maintain a predetermined target of the SOC of the battery 10, and is not limited to the driving of the vehicle in which the engine ENG is operated all the time.

That is, even when the drive mode is the CD mode, the engine ENG is operated if the accelerator pedal is greatly depressed and therefore large vehicle power is requested. Even when the drive mode is the CS mode, the engine ENG is stopped if the SOC exceeds the target value. Therefore, regardless of the drive mode, the driving in which the vehicle is run by using only the motor-generator MG2 while keeping the engine ENG stopped is herein termed the "EV drive", and the driving in which the engine ENG is operated and the vehicle is run by using the motor-generator MG2 and the engine ENG is herein termed the "HV drive".

Figures 3, 4:
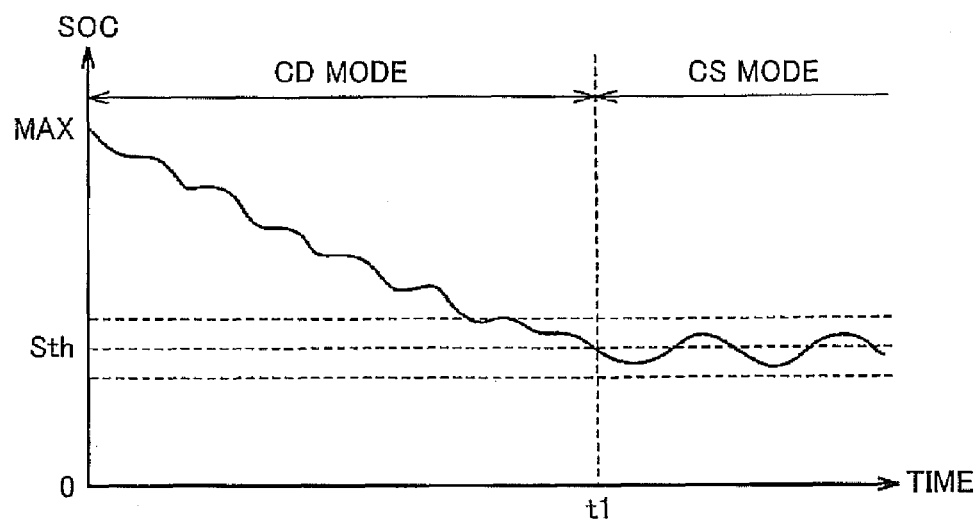
FIG. 3 is a diagram showing a relationship between the changing of the SOC of a battery and the mode of drive of the hybrid vehicle.
FIG. 4 is a table that illustrates learned integrated electric current values that are stored in a memory by the control apparatus according to the first embodiment of the invention.

FIG. 3 is a diagram showing a relationship between the changing of the SOC of the battery 10 and the drive mode. Referring to FIG. 3, it is assumed herein that the driving of the vehicle starts after the battery 10 is brought to the frilly charged state by external charging (SOC=MAX). After the external charging, the drive mode is set to the CD mode. During the drive in the CD mode, the SOC generally decreases with increases of the travel distance although there are occasions when the SOC temporarily increases due to regenerative electric power that is recovered at the time of deceleration or the like. Then, at time t1 when the SOC reaches a threshold value Sth (second predetermined range), the drive mode is switched to the CS mode, in which the SOC is controlled to a vicinity of the threshold value Sth.

Referring back to FIG. 2, when an external electric power supply is connected to the charger inlet 90 (see FIG. 1), the charging control portion 152 generates a control signal for driving the battery charger 92 on the basis of the input voltage Vac and the input current Iac detected by sensors (not shown), and then outputs the generated control signal to the battery charger 92. Then, when the charging control portion 152 detects that the SOC of the battery 10, which is notified by the SOC calculation portion 150, reaches a first predetermined range that corresponds to the fully charged state, the charging control portion 152 ends the charging control and outputs to the drive mode control portion 154 a charging end signal CGEND that shows the end of charging. Thus, the drive mode control portion 154 sets the drive mode to the CD mode as stated above.

The drive mode control portion 154 sets the drive mode to the CD mode as described above, upon receiving from the charging control portion 152 the charging end signal CGEND that shows the end of the external charging. Then, the drive mode control portion 154 outputs a drive mode signal MD that shows whether the drive mode is the CD mode or the CS mode, to the command generation portion 156, the engine start/stop determination portion 158, the battery degradation determination portion 160 and the current integration portion 164. That is, the drive mode control portion 154 sets the drive mode to the CD mode after the charging of the battery 10 by the battery charger 92 ends as the SOC of the battery 10 reaches the first predetermined range. After the driving in the CD mode starts, the drive mode control portion 154 sets the drive mode to the CS mode if the SOC of the battery 10 declines to a second predetermined range that is lower than the first predetermined range. The first predetermined range is a range of the SOC that occurs when the battery 10 is in the fully charged state. The second predetermined range is a range of the SOC close to a lower limit for the use of the battery 10.

The engine start/stop determination portion 158 receives the drive mode signal MD from the drive mode control portion 154. Then, the engine start/stop determination portion 158 performs determination regarding start of the engine ENG and also determination regarding stop of the engine ENG on the basis of the drive mode signal MD and the SOC of the battery 10. The engine start/stop determination portion 158 outputs to the battery degradation determination portion 160 an engine mode signal EGMD that shows whether the engine ENG is in operation or at rest.

Concretely, the engine start/stop determination portion 158 calculates a required vehicle power on the basis of the accelerator operation amount ACC, the vehicle speed SPD, etc., that the engine start/stop determination portion 158 receives as the various sensor outputs 17 (see FIG. 1). Then, on the basis of the required vehicle power, the engine start/stop determination portion 158 performs the engine start determination and the engine stop determination regarding the engine ENG The command generation portion 156 generates a control command value for driving the PCU 20 (e.g., a target value of the voltage Vm, torque target values for the motor-generators MG1 and MG2, etc.) on the basis of the drive mode signal MD, the SOC of the battery 10 and the engine mode signal EGMD. Then, the command generation portion 156 outputs the generated control command value to the converter/inverter control portion 140 (see FIG. 1) of the PCU 20.

The current detection portion 162 detects the current of the battery 10 by a sensor (not shown). The current detection portion 162 outputs a detected value of the current of the battery 10 to the current integration portion 164. The current integration portion 164 receives the drive mode signal MD from the drive mode control portion 154. The current integration portion 164 integrates the current of the battery 10 detected by the current detection portion 162 while the drive mode is the CD mode. The current integration portion 164 outputs the integrated value of current to the battery degradation determination portion 160, the time measurement portion 166 and the temperature detection portion 168.

The time measurement portion 166 receives the integrated current value from the current integration portion 164. The time measurement portion 166 measures the time during which the current integration portion 164 integrates the current. The time measurement portion 166 outputs the measured time to the battery degradation determination portion 160.

The temperature detection portion 168 receives the integrated current value from the current integration portion 164. The temperature detection portion 168 detects the temperature of the battery 10, and calculates an average value of the temperature of the battery 10 occurring during the integration of current by the current integration portion 164. The temperature detection portion 168 outputs the calculated average temperature of the battery 10 to the battery degradation determination portion 160.

The battery degradation determination portion 160 receives the integrated current value from the current integration portion 164, and the measured time from the time measurement portion 166. The battery degradation determination portion 160 also receives the calculated average temperature from the temperature detection portion 168. The battery degradation determination portion 160 performs the determination regarding degradation of the battery 10 on the basis of the integrated current value, the time and the average temperature. Concretely, the battery degradation determination portion 160 calculates a learned integrated current value separately for each of predetermined ranges of the time of integration of current and for each of predetermined ranges of the average temperature. Then, the battery degradation determination portion 160 calculates a learned integrated current value on the basis of the integrated value of the input/output current of the battery 10, the measured time, and the calculated average temperature of the battery 10.

The battery degradation determination portion 160 stores learned integrated current values corresponding to the predetermined ranges of the temperature and to the predetermined ranges of the time as shown in FIG. 4, in a memory of the ECU 15. For example, if the calculated average temperature of the battery 10 falls in a temperature range A1 and the measured time falls in a time range B1, a learned integrated current value C11 (that corresponds to the temperature range A1 and to the time range B1) is updated on the basis of the integrated input/output current of the battery 10. It is to be noted herein that the battery degradation determination portion 160 may update the learned integrated current value stored in the memory by summing the learned integrated current value and the presently integrated input/output current of the battery 10 at predetermined proportions.

Description will be further made with reference to FIG. 2 again. The battery degradation determination portion 160 creates an initial learned value map from learned integrated current values that have been updated a predetermined times. The initial learned value map is stored in the memory of the ECU 15, containing learned integrated current values corresponding to the predetermined ranges of the temperature and to the predetermined ranges of the time, as shown in FIG. 4.

Thus, in the initial learned value map, the learned integrated current values during the initial state occurring prior to degradation of the battery 10 are stored. The aforementioned predetermined number of times is, for example, a certain number of times that is sufficient to obtain learned values during the initial state of the battery 10.

The battery degradation determination portion 160 creates a present learned value map after learned integrated current values are updated a predetermined number of times. The present learned value map is also stored in the memory of the ECU 15, containing learned integrated current values corresponding to the predetermined ranges of the temperature and to the predetermined ranges of the time, similarly to the initial learned value map. In the present learned value map, the updated learned integrated current values are stored.

The battery degradation determination portion 160 calculates a degree of capacity decline of the battery 10. The degree of capacity decline is the proportion of a learned integrated current value stored in the present learned value map to a corresponding one of the learned integrated current values stored in the initial learned value map. It is to be noted herein that the degree of capacity decline is calculated separately for each of the learned integrated current values stored in the present learned value map.

The battery degradation determination portion 160 performs determination regarding degradation of the battery 10. The battery degradation determination portion 160 determines that the battery 10 has degraded, if any one of the calculated degrees of capacity decline is lower than a predetermined value. This predetermined value is set, for example, on the basis of the amount of decline in the full charge capacity which amount requires replacement of the battery 10.

Although in the foregoing example, the battery degradation determination portion 160 calculates a learned integrated current value separately for each of the predetermined ranges of the temperature and for each of the predetermined ranges of the time, calculating a learned integrated current value separately for each of the predetermined ranges of the temperature and for each of the predetermined ranges of the time may be omitted in the case where variations of the temperature and of the time are small.

Figure 5A:
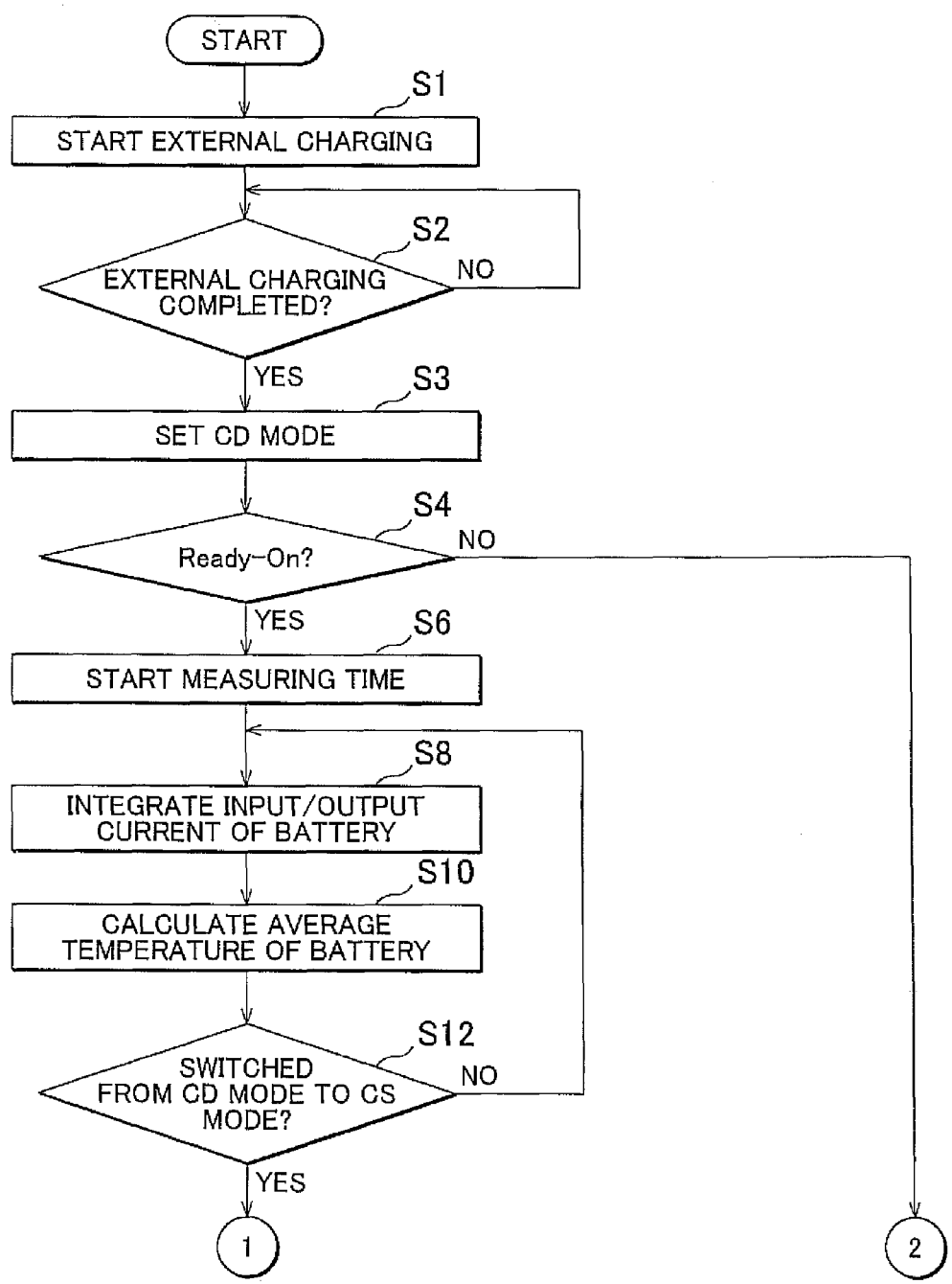
FIGS. 5A and 5B are flowcharts showing a control structure of a program related to the determination regarding degradation of a battery that is executed by the control apparatus according to the first embodiment of the invention.
Figure 5B:
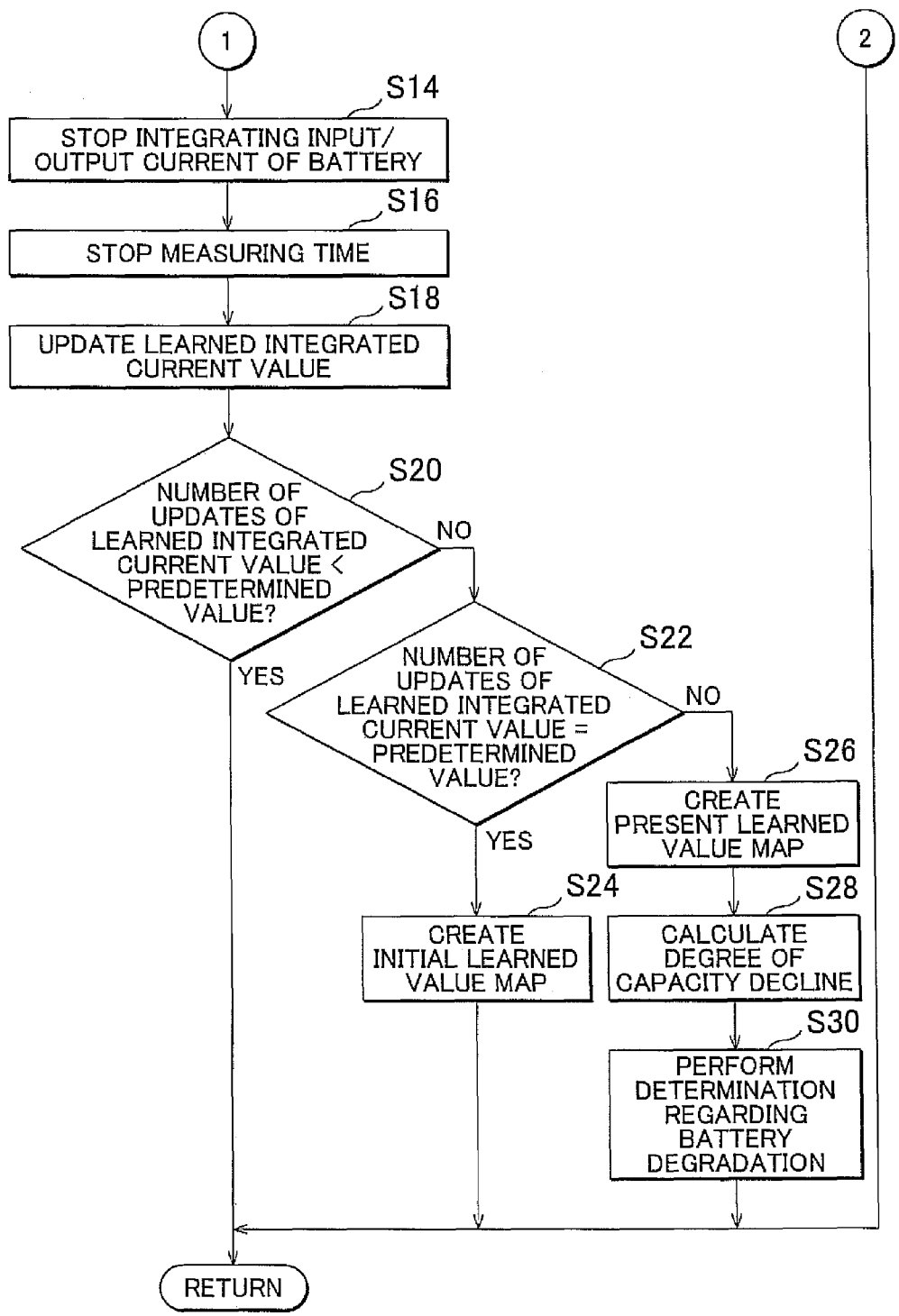

FIGS. 5A and 5B are flowcharts showing a control structure of a program related to the determination regarding degradation of the battery 10 that is executed by the ECU 15 according to the first embodiment of the invention. A process routine shown by this flowchart which branches from a main routine is executed at every predetermined time or every time a predetermined condition is satisfied.

Description will be further made with reference to FIG. 5A. In step 1 (hereinafter, step will be termed S and therefore, for example, step 1 will be termed S1), the ECU 15 starts external charging, upon receiving a charging request from a user. Subsequently in S2, the ECU 15 determines whether the battery 10 has reached the fully charged state and the external charging has been completed. If an affirmative determination is made in this step (YES in S2), the process proceeds to S3.

In S3, the ECU 15 sets the drive mode to the CD mode. Subsequently in S4, the ECU 15 determines whether the vehicle is in a "Ready-On" state. "Ready-On" indicates that the vehicle is in a state of being able to drive. If an affirmative determination is made in this step (YES in S4), the process proceeds to S6.

In S6, the ECU 15 starts to measure time. Subsequently in S8, the ECU 15 starts to integrate the current input to and output from the battery 10. Subsequently in S10, the ECU 15 calculates an average temperature of the battery 10.

Subsequently in S12, the ECU 15 determines whether the SOC of the battery 10 has declined to the second predetermined range that is lower than the first predetermined range and, therefore, the drive mode has been switched from the CD mode to the CS mode. If an affirmative determination is made in this step (YES in S12), the process proceeds to S14 (see FIG. 5B). On the other hand, if a negative determination is made in S12 (NO in S12), the process returns to S8.

Description will be further made with reference to FIG. 5B. In S14, the ECU 15 stops integrating the current input to and output from the battery 10. Subsequently in S16, the ECU 15 stops measuring time.

Subsequently in S18, the ECU 15 calculates a learned integrated current value separately for each of the predetermined ranges of the time of integration of the current and for each of the predetermined ranges of the average temperature. Then, the ECU 15 updates the learned integrated current values on the basis of the integrated value of the current input to and output from the battery 10, the measured time, and the calculated average temperature of the battery 10. The ECU 15 stores learned integrated current values corresponding to the predetermined ranges of the temperature and to the predetermined ranges of the time as shown in FIG. 4, in the memory of the ECU 15. For example, if the calculated average temperature of the battery 10 falls in the temperature range A1 and the measured time falls in the time range B1, the learned integrated current value C11 is updated on the basis of the integrated input/output current of the battery 10. It is to be noted herein that the ECU 15 may update the one of the learned integrated current values stored in the memory by summing the learned integrated current value and the presently integrated input/output current of the battery 10 at predetermined proportions.

Subsequently in S20, the ECU 15 determines whether the number of times that the learned integrated current value has been updated is less than a predetermined value. It is to be noted herein that the determination regarding the number of times that a learned integrated current value has been updated is performed separately for each of the predetermined different ranges of the temperature and for each of the predetermined different ranges of the time. If a negative determination is made in this step (NO in S20), the process proceeds to S22. The aforementioned predetermined value is, for example, a value that is sufficient to obtain learned values occurring during the initial state occurring before the battery 10 degrades.

In S22, the ECU 15 determines whether the number of times that the learned integrated current value has been updated is equal to a predetermined value. If an affirmative determination is made in this step (YES in S22), the process proceeds to S24. On the other hand, if a negative determination is made in S22 (NO in S22), the process proceeds to S26.

In S24, the ECU 15 creates an initial learned value map from learned integrated currents that have been updated the predetermined number of times. The initial learned value map is stored in the memory of the ECU 15, containing learned integrated current values corresponding to the predetermined ranges of the temperature and to the predetermined ranges of the time, as shown in FIG. 4. Thus, in the initial learned value map, learned integrated current values during the initial state occurring before the battery 10 degrades are stored. Incidentally, an initial learned value map may also be prepared and stored in the memory beforehand.

In S26, the ECU 15 creates a present learned value map. The present learned value map is also stored in the memory of the ECU. 15, containing the learned integrated current values corresponding to the predetermined ranges of the temperature and to the predetermined ranges of the time, similarly to the initial learned value map. In the present learned value map, the learned integrated current value updated in S18 is stored.

Subsequently in S28, the ECU 15 calculates degrees of capacity decline of the battery 10. The degree of capacity decline is the proportion of a learned integrated current value stored in the present learned value map to a corresponding one of the learned integrated current values stored in the initial learned value map. It is to be noted herein that the degree of capacity decline is calculated separately for each one of the learned integrated current values stored in the present learned value map.

Subsequently, in S30, the ECU 15 performs determination regarding degradation of the battery 10. The ECU 15 determines that the battery 10 has degraded, if any one of the degrees of capacity decline calculated in S28 is lower than a predetermined value. This predetermined value is set, for example, on the basis of the amount of decline in the full charge capacity which amount requires replacement of the battery 10.

As described above, in the first embodiment, the drive mode control portion 154 sets the drive mode to the CD mode after the charging of the battery 10 by the charger 92 ends as the state of charge of the battery 10 reaches the first predetermined range. The battery degradation determination portion 160 performs the determination regarding degradation of the battery 10 on the basis of the integrated current value obtained by integrating the input/output current of the battery 10 collected during the drive in the CD mode. Thus, if the battery 10 is charged with electric power received from an electric power supply provided outside the vehicle, determination regarding degradation of the battery 10 can be started. Therefore, opportunities of determining degradation of the battery 10 can be secured. Furthermore, after the driving of the vehicle in the CD mode drive starts, the drive mode control portion 154 switches the drive mode to the CS mode if the state of charge of the battery 10 declines to the second predetermined range that is lower than the first predetermined range. Thus, the CD mode is maintained until the state of charge of the battery 10 declines to the second predetermined range lower than the first predetermined range. Therefore, a range of the state of charge of the battery 10 for collecting integrated current values for use for the degradation determination can be secured. Hence, according to the first embodiment, degradation of the battery 10 mounted in the hybrid vehicle 100 can be detected accurately and highly frequently.

Furthermore, in the first embodiment, the ECU 15 performs the determination regarding degradation of the battery 10 on the basis of the amount of decline of the integrated current value from the initial integrated current value measured during the initial state prior to the degradation of the battery 10. In this manner, the comparison of the present state with the initial state of the battery 10 reduces the influence of variations among products of batteries 10. Therefore, detection accuracy further improves.

Furthermore, in the first embodiment, the ECU 15 calculates an integrated current value separately for each of the predetermined ranges of the temperature of the battery 10. Due to this, degradation of the battery 10 can be determined by factoring in differences in the value of resistance of the battery 10 depending on temperature. Therefore, detection accuracy further improves.

Furthermore, in the first embodiment, the ECU 15 calculates an integrated current value separately for each of the predetermined ranges of time. Due to this, the influence of errors of the electric current sensor can be restrained. Therefore, detection accuracy further improves.

Furthermore, in the first embodiment, the ECU 15 continues the degradation determination in the case where the engine ENG enters an operating state when the ECU 15 is integrating the input/output current of the battery 10. Due to this, a certain frequency of occurrence of the detection for degradation of the battery 10 can be secured. Therefore, the detection is performed more frequently.

Incidentally, the ECU 15 may stop the process of performing the determination regarding degradation of the battery 10, if the engine ENG runs before the drive mode switches from the CD mode to the CS mode. In this case, the ECU 15 stops the degradation determination if the engine ENG enters the operating state when the ECU 15 is integrating the input/output current of the battery 10. Due to this, the ECU 15 does not perform the determination regarding degradation of the battery 10 in the case where the distance of drive in the CD mode increases due to energy generated by the engine ENG. Therefore, it is possible to restrain the decline in detection accuracy caused by increase in the distance of drive in the CD mode.

Second Embodiment

A second embodiment of the invention is different from the first embodiment in that determination regarding degradation of the battery is performed on the basis of integrated electric power value instead of the integrated current value. In the second embodiment, the use of the integrated electric power value makes it possible to perform determination regarding decline in the frill charge capacity of the battery 10 on the basis of the energy that the battery 10 outputs. Due to this, degradation of the battery 10 mounted in the hybrid vehicle 100 can be accurately detected. Furthermore, since the electric power output from the battery 10 is used, the influence of the temperature of the battery 10 on detection accuracy can be restrained.

Figure 6:
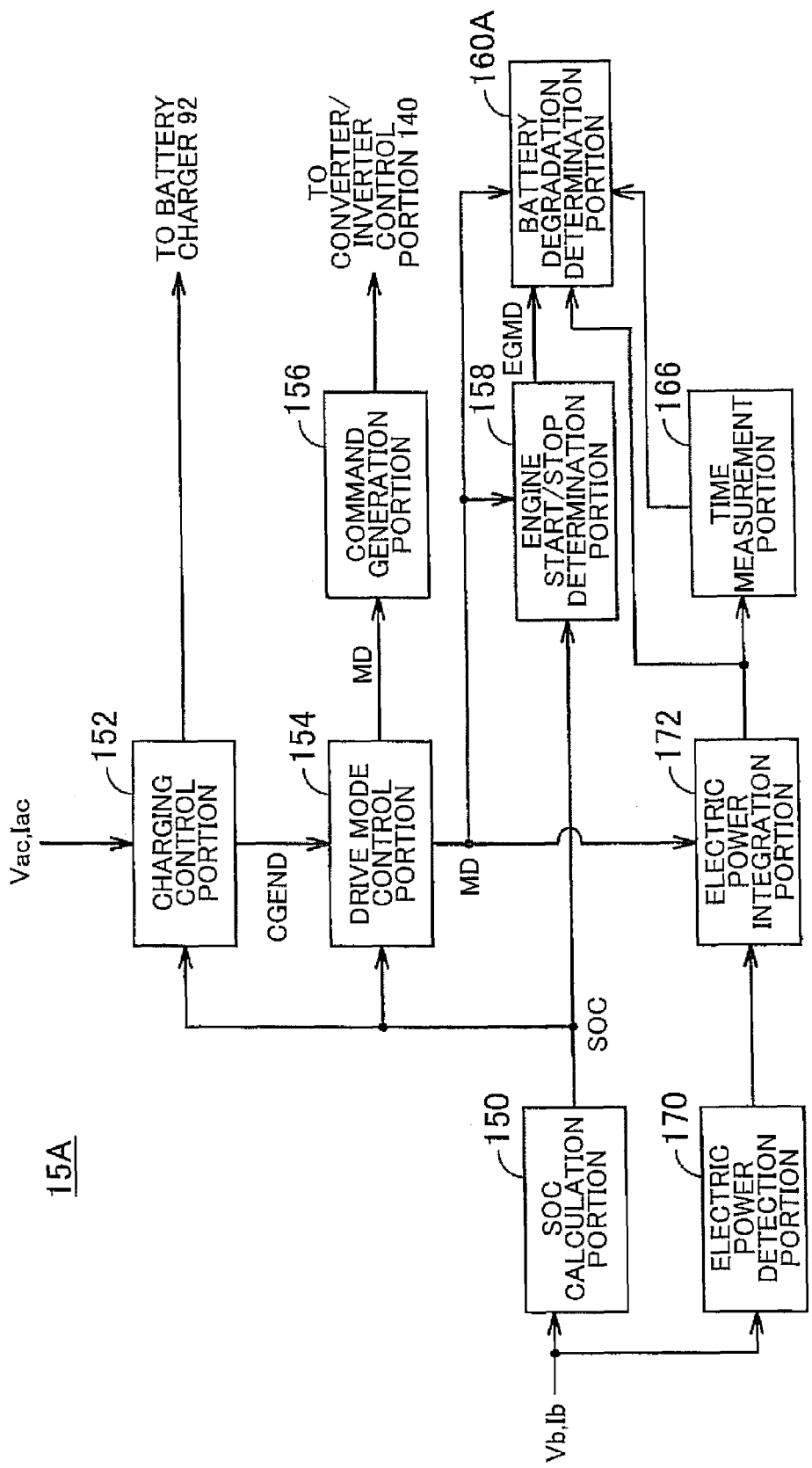
FIG. 6 is a functional block diagram of a control apparatus according to a second embodiment of the invention.

FIG. 6 is a functional block diagram of an ECU 15A according to the second embodiment of the invention. Referring to FIG. 6 in comparison with FIG. 2, the ECU 15A according to the second embodiment is different from the ECU 15 according to the first embodiment in that an electric power detection portion 170 and an electric power integration portion 172 are provided instead of the current detection portion 162, the current integration portion 164 and the temperature detection portion 168, and in that a battery degradation determination portion 160A is different from the battery degradation determination portion 160.

The electric power detection portion 170 detects the electric power of the battery 10 by a sensor (not shown). The electric power detection portion 170 outputs a detected value of the electric power of the battery 10 to the electric power integration portion 172. The electric power integration portion 172 receives the drive mode signal MD from the drive mode control portion 154. The electric power integration portion 172 integrates the electric power of the battery 10 detected by the electric power detection portion 170 while the drive mode is the CD mode. The electric power integration portion 172 outputs the integrated electric power value to the battery degradation determination portion 160A.

The battery degradation determination portion 160A receives the integrated electric power value from the electric power integration portion 172 and also receives measured time from the time measurement portion 166. The battery degradation determination portion 160A performs determination regarding degradation of the battery 10 on the basis of the integrated electric power value and the time. Concretely, the battery degradation determination portion 160A calculates a learned integrated electric power value separately for each one of predetermined ranges of the time of integration of electric power. Then, the battery degradation determination portion 160A calculates a learned integrated electric power value on the basis of the integrated value of the input/output electric power of the battery 10 and the measured time.

The battery degradation determination portion 160A stores learned integrated electric power values corresponding to the predetermined ranges of the time as shown in FIG. 7, in a memory of the ECU 15A. For example, if the measured time falls in a time range B1, a learned integrated electric power value D1 (that corresponds to the time range B1) is updated on the basis of the integrated input/output electric power of the battery 10. It is to be noted herein that the battery degradation determination portion 160A may update the learned integrated electric power value stored in the memory by summing the learned integrated electric power value and the presently integrated input/output electric power of the battery 10 at predetermined proportions.

The battery degradation determination portion 160A, similar to the battery degradation determination portion 160, calculates the degree of capacity decline of the battery 10 from the learned integrated electric power value, and performs determination regarding degradation of the battery 10.

Figure 8A:
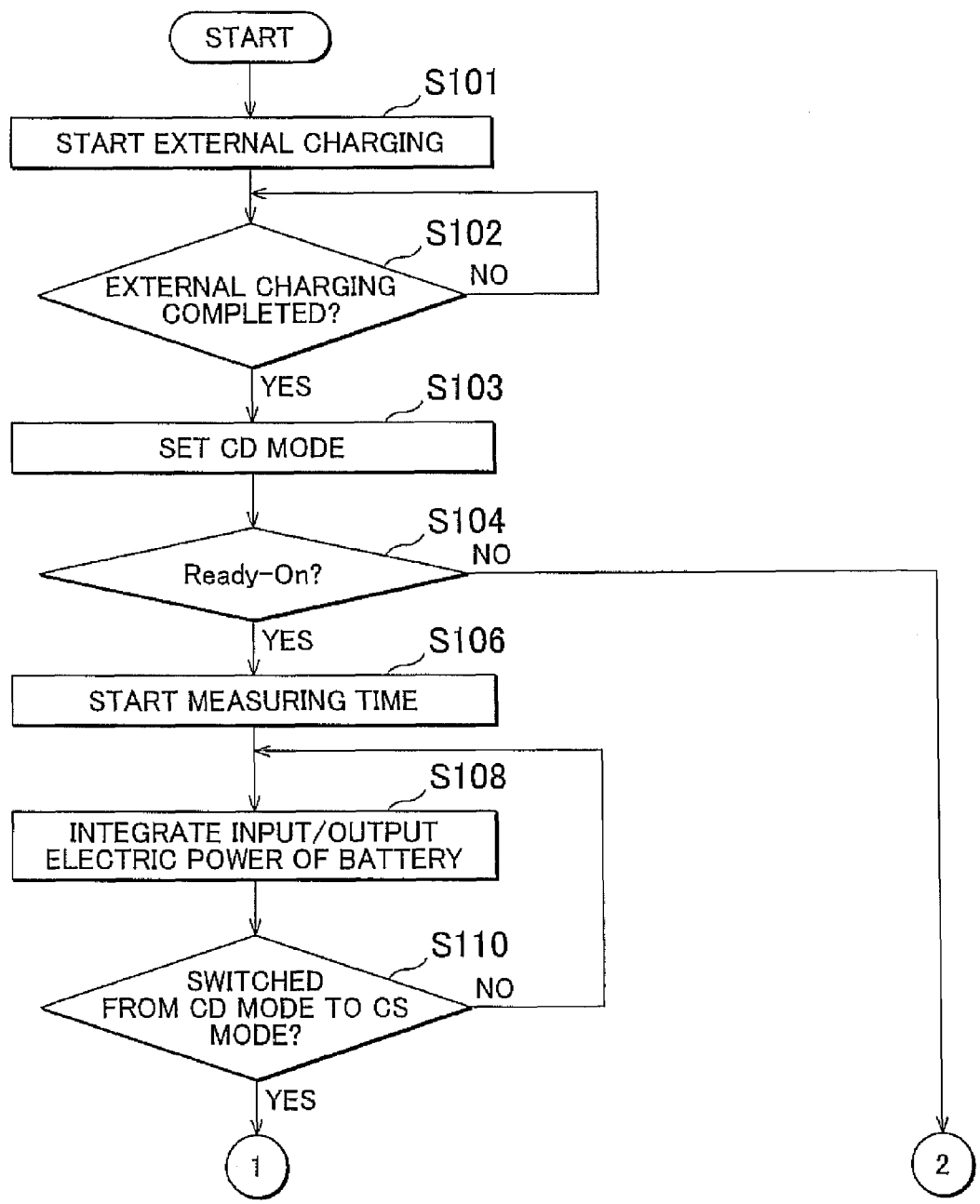
FIGS. 8A and 8B are flowcharts showing a control structure of a program related to the determination regarding degradation of a battery that is executed by the control apparatus according to the second embodiment of the invention.
Figure 8B:
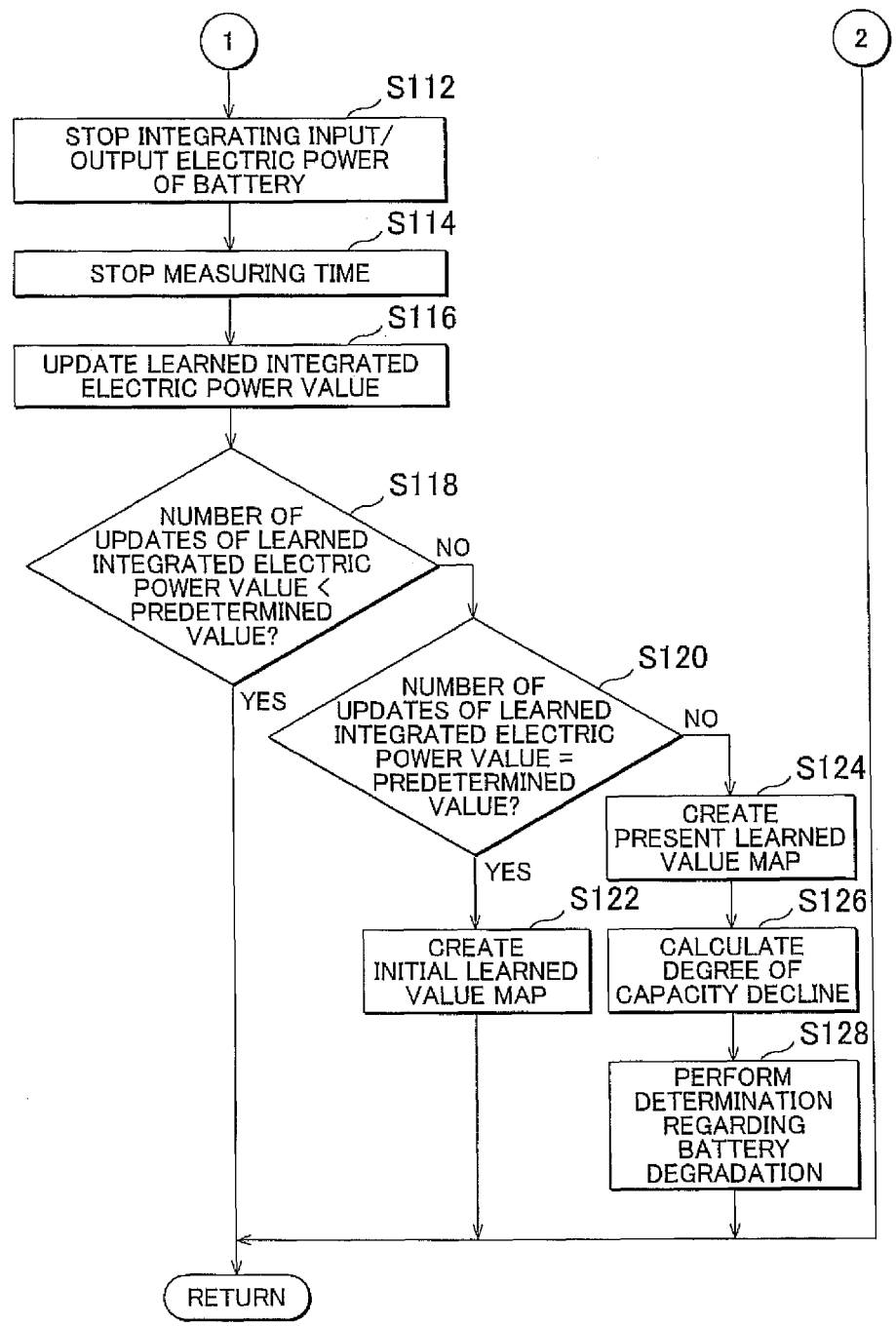

FIGS. 8A and 8B are flowcharts showing a control structure of a program related to the determination regarding degradation of the battery 10 that is executed by the ECU 15A according to the second embodiment of the invention. A process routine shown by this flowchart which branches from a main routine is executed at every predetermined time or every time a predetermined condition is satisfied.

Referring to FIG. 8A, the steps S101 to S106 are the same as the steps S1 to S6 in the first embodiment, and therefore the descriptions thereof will not be repeated.

In S108, the ECU 15A starts to integrate the electric power input to and output from the battery 10. Subsequently in S110, the ECU 15A determines whether the drive mode has switched from the CD mode to the CS mode due to decline of the SOC of the battery 10 to a second predetermined range that is lower than a first predetermined range. If an affirmative determination is made in this step (YES in S110), the process proceeds to S112 (see FIG. 8B). On the other hand, if a negative determination is made in S110 (NO in S110), the process returns to S108.

Description will be further made with reference to FIG. 8B. In S112, the ECU 15A stops integrating the electric power input to and output from the battery 10. Subsequently in S114, the ECU 15A stops measuring time.

Subsequently in S116, the ECU 15A calculates a learned integrated electric power value for each of the predetermined range of the time of integration of electric power. Then, the ECU 15A updates the learned integrated electric power value on the basis of the integrated value of the input/output electric power of the battery 10 and the measured time. The ECU 15A stores learned integrated electric power values corresponding to the predetermined ranges of time as shown in FIG. 7, in the memory of the ECU 15A. For example, if the measured time falls in the time range B1, the learned integrated electric power value D1 corresponding to the time range B1 is updated on the basis of the integrated input/output electric power of the battery 10. It is to be noted herein that the ECU 15A may update the learned integrated electric power value stored in the memory by summing the learned integrated electric power value and the integrated input/output electric power of the battery 10 at predetermined proportions.

The steps S118 to S128 are the same as the steps S20 to S30 in the first embodiment, and the descriptions thereof will not be repeated.

As described above, in the second embodiment, the ECU 15A performs determination regarding degradation of the battery 10 on the basis of the integrated electric power value obtained by integrating the input/output electric power of the battery 10. Due to this, degradation of the full charge capacity of the battery 10 can be determined on the basis of the energy that the battery 10 outputs. Therefore, according to the second embodiment, degradation of the battery 10 mounted in the hybrid vehicle 100 can be more accurately detected. Furthermore, since the electric power output from the battery 10 is used for the detection of the degradation and the loss caused by generated heat is included in the electric power, the influence of the temperature of the battery 10 on detection accuracy can be restrained.

Incidentally, in the second embodiment, too, the ECU 15A may stop the degradation determination process if the engine ENG runs before the drive mode switches from the CD mode to the CS mode. In this case, the ECU 15A stops the degradation determination if the engine ENG enters the operating state when the battery 10 is integrating the input/output electric power. Due to this, decline of detection accuracy can be restrained.

Third Embodiment

A third embodiment of the invention is different from the first embodiment in that degradation of the battery 10 is determined on the basis of the travel distance instead of the integrated current value. In the third embodiment, the use of the travel distance makes it possible to make a determination that agrees with the degree of degradation of the battery 10 that an occupant feels.

Figure 9:
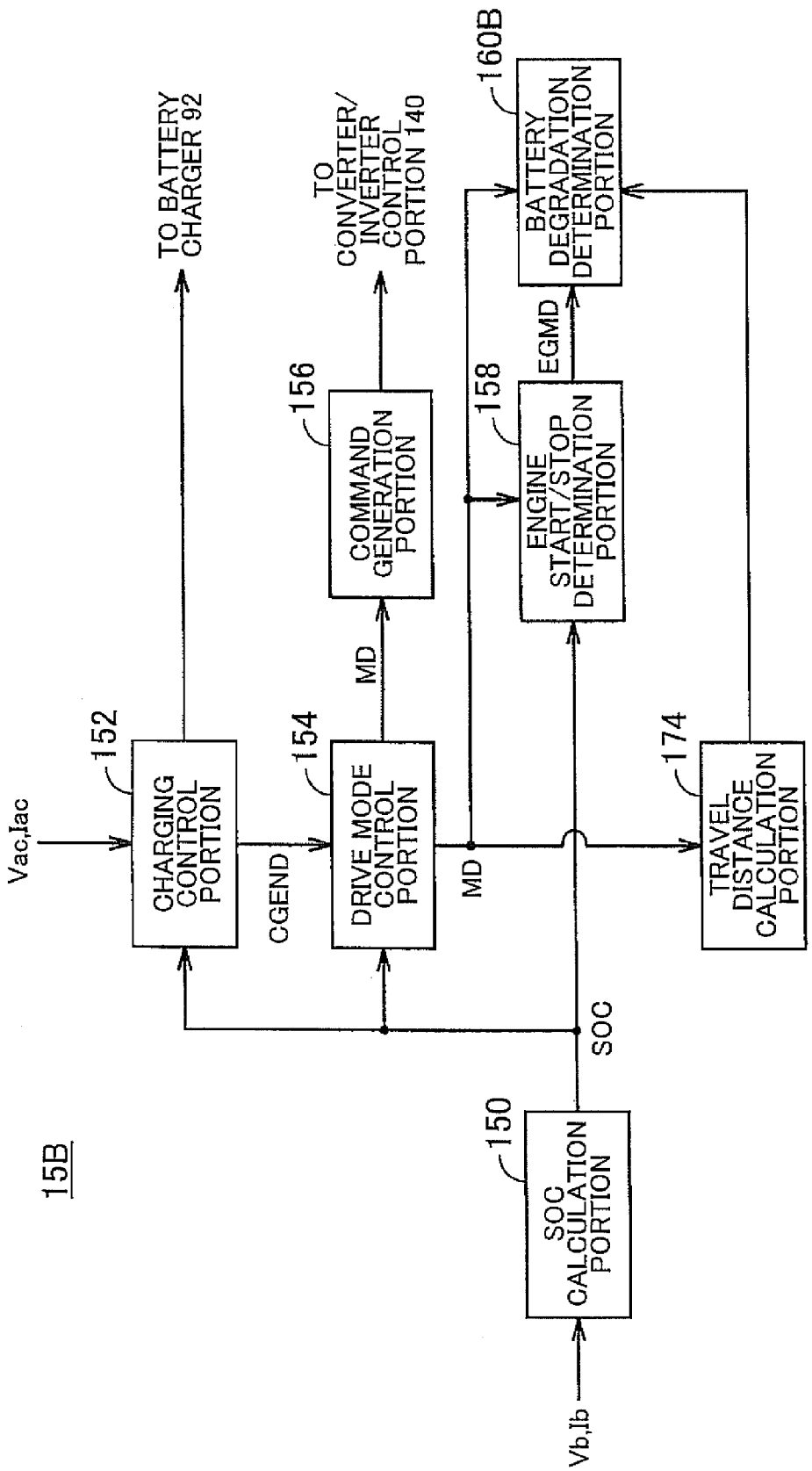
FIG. 9 is a functional block diagram of a control apparatus according to a third embodiment of the invention.

FIG. 9 is a functional block diagram of an ECU 15B according to the third embodiment of the invention. Referring to FIG. 9 in comparison with FIG. 2, the ECU 15B according to the third embodiment is different from the ECU 15 in that a travel distance calculation portion 174 is provided instead of the current detection portion 162, the current integration portion 164, the time measurement portion 166 and the temperature detection portion 168, and in that a battery degradation determination portion 160B is different from the battery degradation determination portion 160.

The travel distance calculation portion 174 receives the drive mode signal MD from the drive mode control portion 154. The travel distance calculation portion 174 calculates the travel distance that the hybrid vehicle 100 has driven while the drive mode is the CD mode. The travel distance calculation portion 174 outputs the calculated travel distance to the battery degradation determination portion 160B.

The battery degradation determination portion 160B receives the travel distance calculated by the travel distance calculation portion 174. The battery degradation determination portion 160B performs determination regarding degradation of the battery 10 on the basis of the travel distance. Concretely, the battery degradation determination portion 160B calculates the average vehicle speed, the average acceleration, the electric power consumed by the air conditioner, the electric power consumed by the accessory loads and slope data, and estimates the vehicle weight and the engine output.

Figures 10, 11:
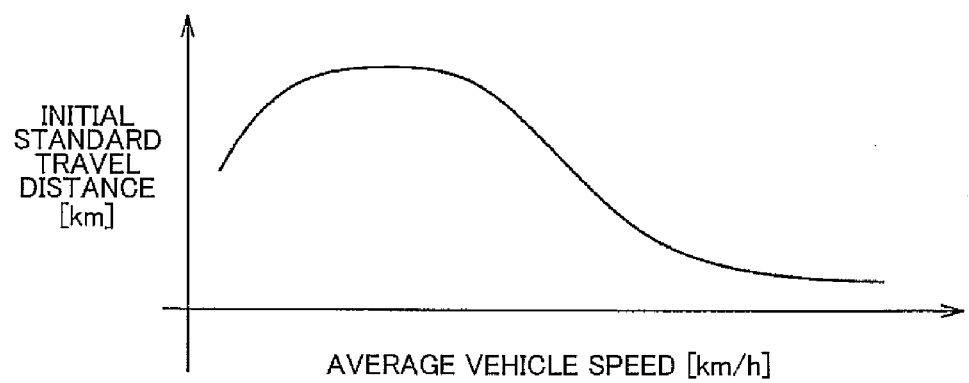
FIG. 10 is a graph showing a relationship between the initial standard travel distance and the average vehicle speed.
FIG. 11 is a table that illustrates initial standard travel distances that are stored in a memory by the control apparatus according to the third embodiment of the invention.

The battery degradation determination portion 160B calculates an initial standard travel distance. The initial standard travel distance is the travel distance during the initial state prior to degradation of the battery 10. As shown in FIG. 10, the initial standard travel distance varies depending on the average vehicle speed. This is because the rate of loss of energy varies depending on the vehicle speed. The battery degradation determination portion 160B stores initial standard travel distances corresponding to predetermined ranges of the average vehicle speed as a map as shown in FIG. 11, into a memory provided in the ECU 15B. The battery degradation determination portion 160B obtains an initial standard travel distance by referring to the map on the basis of the calculated average vehicle speed.

Figures 12, 13:
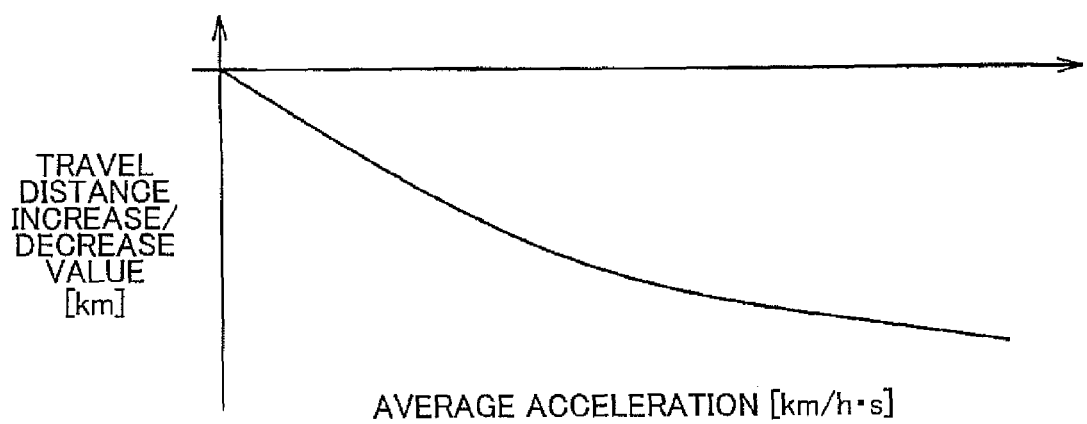
FIG. 12 is a graph showing a relationship between the travel distance increase/decrease value and the average acceleration.
FIG. 13 is a table that illustrates a relationship between travel distance increase/decrease values stored into a memory by the control apparatus according to the third embodiment of the invention.

The battery degradation determination portion 160B calculates a travel distance increase/decrease value. The travel distance increase/decrease value is a value that represents increase/decrease in the travel distance due to the average acceleration, the air conditioner-consumed electric power, the accessory load-consumed electric power, the altitude difference and the vehicle weight. For example, if the average acceleration increases as shown in FIG. 12, the travel distance decreases since the loss of energy increases. Likewise, the travel distance also decreases when the electric power consumption increases. Furthermore, in the case where the altitude increases from the location where the drive starts and in the case where the weight of the vehicle is increased, the travel distance decreases due to increased loss of energy. The battery degradation determination portion 160B stores a travel distance increase/decrease value separately for each of predetermined ranges of the average acceleration as a map as shown in FIG. 13, into the memory of the ECU 15B. The battery degradation determination portion 160B obtains a travel distance increase/decrease value by referring to the map on the basis of the average acceleration calculated in S210.

The battery degradation determination portion 160B stores travel distance increase/decrease values, as a map in the memory of the ECU 15B, corresponding to predetermined range of the value obtained by subtracting the estimated engine output from the sum of the calculated air conditioner-consumed electric power and the calculated electric power consumed by the accessory loads. The battery degradation determination portion 160B obtains a travel distance increase/decrease value by referring to the map on the basis of the aforementioned value.

The battery degradation determination portion 160B stores travel distance increase/decrease values corresponding to predetermined ranges of the altitude difference as a map in the memory provided in the ECU 15B. The battery degradation determination portion 160B obtains a travel distance increase/decrease value by referring to the map on the basis of the calculated altitude difference. The battery degradation determination portion 160B stores travel distance increase/decrease values corresponding to predetermined ranges of the vehicle weight as a map in the memory of the ECU 15B. The battery degradation determination portion 160B obtains a travel distance increase/decrease value by referring to the map on the basis of the calculated vehicle weight.

The battery degradation determination portion 160B calculates an assumed-for-new-car travel distance. The assumed-for-new-car travel distance is a travel distance that is assumed for an initial state prior to degradation of the battery 10. Concretely, each assumed-for-new-car travel distance is the sum of the calculated initial standard travel distance and a corresponding one of the calculated travel distance increase/decrease values.

The battery degradation determination portion 160B calculates the degree of capacity decline of the battery 10. The degree of capacity decline is the proportion of the actual travel distance to the assumed-for-new-car travel distance. The battery degradation determination portion 160B, similar to the battery degradation determination portion 160, performs determination regarding degradation of the battery 10 on the basis of the degree of capacity decline.

Figure 14A:
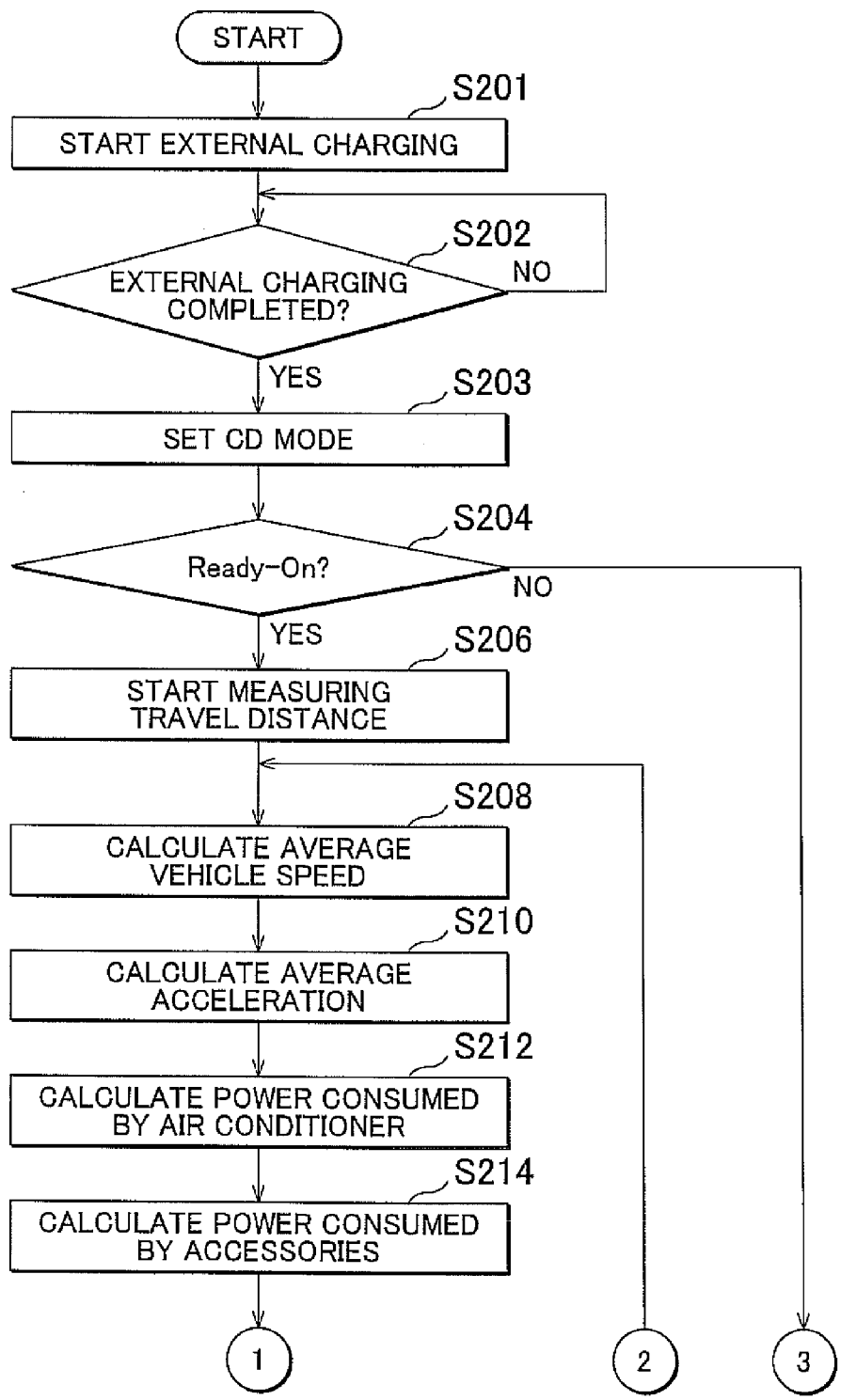
FIGS. 14A and 14B are flowcharts showing a control structure of a program related to the determination regarding degradation of a battery that is executed by the control apparatus according to the third embodiment of the invention.
Figure 14B:
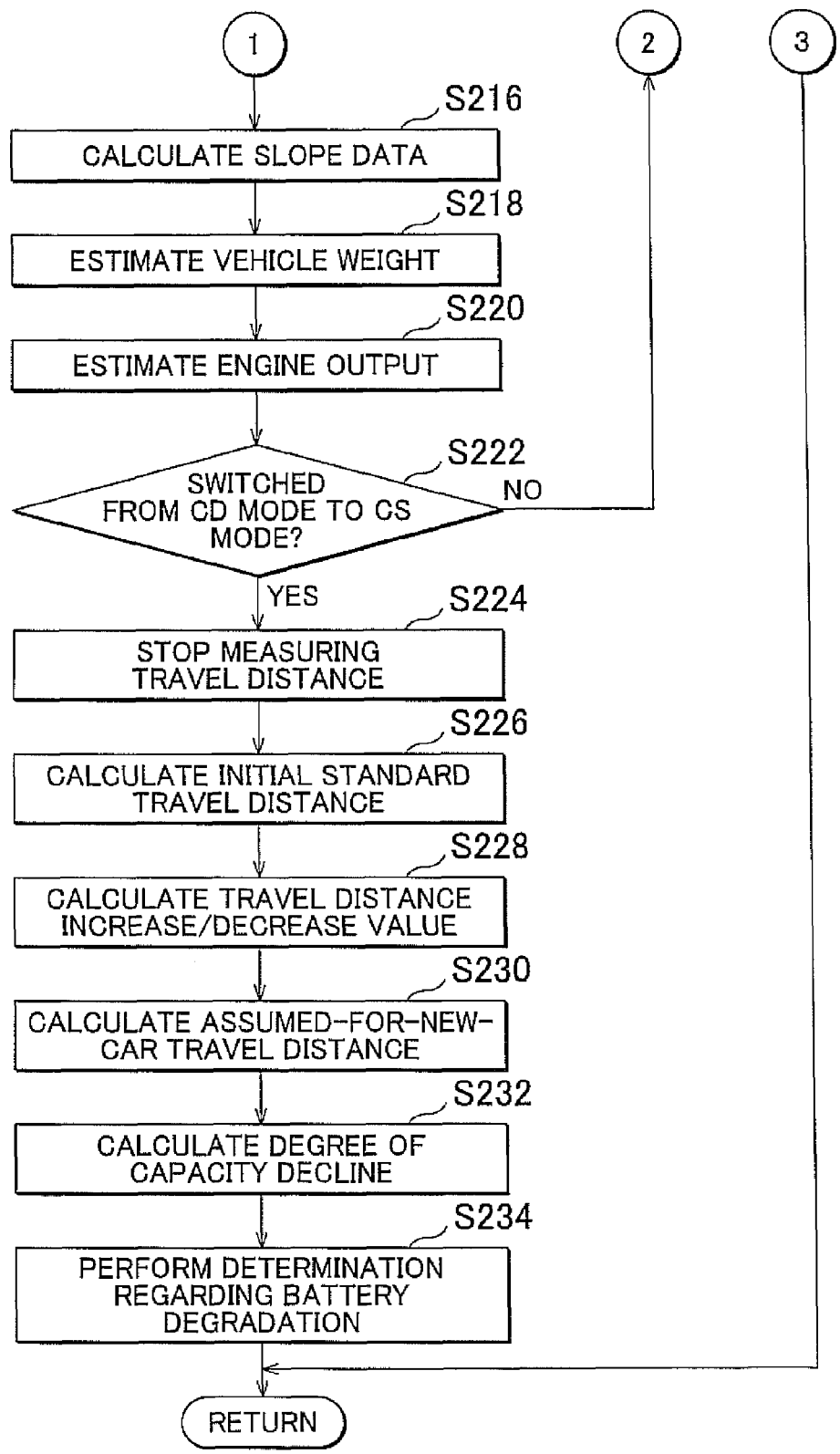

FIGS. 14A and 14B are flowcharts showing a control structure of a program related to the determination regarding degradation of the battery 10 executed by the ECU 15B according to the third embodiment of the invention. A process routine shown by this flowchart which branches from a main routine is executed at every predetermined time or every time a predetermined condition is satisfied.

Referring to FIG. 14A, the steps S201 to S204 are the same as the steps S1 to S4 in the first embodiment, and the descriptions thereof will not be repeated.

In S206, the ECU 15B starts to measure the travel distance of the hybrid vehicle 100. Subsequently in S208, the ECU 15B calculates the average vehicle speed of the hybrid vehicle 100. Subsequently in S210, the ECU 15B calculates the average acceleration of the hybrid vehicle 100. Subsequently in S212, the ECU 15B calculates the electric power consumed by the electric air conditioner mounted in the hybrid vehicle 100. Subsequently in S214, the ECU 15B calculates the electric power consumed by the accessory loads mounted in the hybrid vehicle 100.

Description will be further made with reference to FIG. 14B. Subsequently in S216, the ECU 15B calculates slope data regarding the hybrid vehicle 100. The slope data is the altitude difference from the location point of start of the driving of the hybrid vehicle 100 to the location point at which the vehicle is presently driving. The ECU 15B receives a signal that shows the tilt of the hybrid vehicle 100 in the front-rear direction from a slope sensor mounted in the hybrid vehicle 100. The ECU 15B integrates the multiplication product of the tilt by the vehicle speed. Due to this, the ECU 15B calculates the altitude difference from the location point at which the hybrid vehicle 100 started driving to the location point at which the vehicle is presently driving.

Subsequently in S218, the ECU 15B estimates the weight of the hybrid vehicle 100. The ECU 15B receives a signal that shows whether an occupant is seated, from a seat occupancy sensor mounted in the hybrid vehicle 100. The ECU 15B detects the number of occupants in the hybrid vehicle 100 from the signal. The ECU 15B adds a pre-stored standard vehicle weight to the multiplication product of the detected number of occupants by a pre-stored standard weight of an occupant. Due to this, the ECU 15B estimates the weight of the hybrid vehicle 100.

Subsequently in S220, the ECU 15B estimates the output of the engine ENG. The ECU 15B measures data indicating the intake air amount, the intake air temperature, the engine rotation speed, the amount of fuel injection and the air/fuel ratio by various sensors mounted in the hybrid vehicle 100. The ECU 15B estimates the output of the engine ENG by referring to the map for calculating the output of the engine ENG on the basis of aforementioned data. This map is created in advance, and is stored in the ECU 15B.

Subsequently in S222, the ECU 15B determines whether the SOC of the battery 10 has declined to the second predetermined range that is lower than the first predetermined range and therefore the drive mode has switched from the CD mode to the CS mode. If an affirmative determination is made in this step (YES in S222), the process proceeds to S224. On the other hand, if a negative determination is made in S222 (NO in S222), the process returns to S208.

In S224, the ECU 15B stops measuring the travel distance of the hybrid vehicle 100.

Subsequently in S226, the ECU 15B calculates the initial standard travel distance. The initial standard travel distance is a travel distance during the initial state prior to degradation of the battery 10. As shown in FIG. 10, the initial standard travel distance assumes different values depending on the average vehicle speed. This is because the rate of loss of energy varies depending on the vehicle speed. The ECU 15B stores initial standard travel distances separately for each of the predetermined ranges of the average vehicle speed as a map as shown in FIG. 11, into the memory of the ECU 15B. The ECU 15B obtains an initial standard travel distance by referring to the map on the basis of the average vehicle speed calculated in S208.

Subsequently in S228, the ECU 15B calculates the travel distance increase/decrease value. The travel distance increase/decrease value is a value that represents increase/decrease in the travel distance due to the average acceleration, the air conditioner-consumed electric power, the accessory load-consumed electric power, the altitude difference and the vehicle weight. For example, as show in FIG. 12, if the average acceleration increases, the loss of energy increases and, therefore, the travel distance decreases. Likewise, if the electric power consumption increases, the travel distance also decreases. Furthermore, in the case where the altitude has increased from the location point of start of the driving and in the case where the weight of the vehicle has increased, the loss of energy increases, so that the travel distance decreases. The ECU 15B stores travel distance increase/decrease values corresponding to predetermined ranges of the average acceleration as a map as shown in FIG. 13 in the memory of the ECU 15B. The ECU 15B obtains a travel distance increase/decrease value by referring to the map on the basis of the average acceleration calculated in S210.

Likewise, the ECU 15B stores travel distance increase/decrease values corresponding to predetermined ranges of electric power consumption as a map in a memory provided in the ECU 15B. The ECU 15B obtains a travel distance increase/decrease value by referring to the map on the basis of a value obtained by subtracting the engine output estimated in S220 from the sum of the air conditioner-consumed electric power calculated in S212 and the electric power consumed by the accessory loads that is calculated in S214.

Furthermore, the ECU 15B stores travel distance increase/decrease values corresponding to the predetermined ranges of altitude difference as a map in the memory of the ECU 15B. The ECU 15B obtains a travel distance increase/decrease value by referring to the map on the basis of the altitude difference calculated in S216. Furthermore, the ECU 15B stores travel distance increase/decrease values corresponding to the predetermined ranges of the vehicle weight as a map in the memory of the ECU 15B. The ECU 15B obtains a travel distance increase/decrease value by referring to the map on the basis of the vehicle weight calculated in S218.

Subsequently in S230, the ECU 15B calculates an assumed-for-new-car travel distance. The assumed-for-new-car travel distance is a travel distance that is assumed in the case where the battery 10 is in an initial state prior to degradation of the battery 10. Concretely, each assumed-for-new-car travel distance is the sum of the initial standard travel distance calculated in S226 and a corresponding one of travel distance increase/decrease values calculated in S228.

Subsequently in S232, the ECU 15B calculates the degree of capacity decline of the battery 10. The degree of capacity decline is the proportion of the actual travel distance to the assumed-for-new-car travel distance.

Step S234 is the same as step 530 in the first embodiment, and the description thereof will not be repeated. As in the above, in the third embodiment, the ECU 15B performs determination regarding degradation of the battery 10 on the basis of the travel distance. Due to this, it is possible to make a determination that agrees with the degree of degradation of the battery 10 that an occupant feels.

Modification

A modification of the third embodiment of the invention is different from the third embodiment in that the vehicle speed of the hybrid vehicle 100, the average acceleration thereof, the electric power consumption, the slope data and the vehicle weight for performing the degradation determination are relatively limited. Therefore, detection accuracy improves.

Figure 15A:
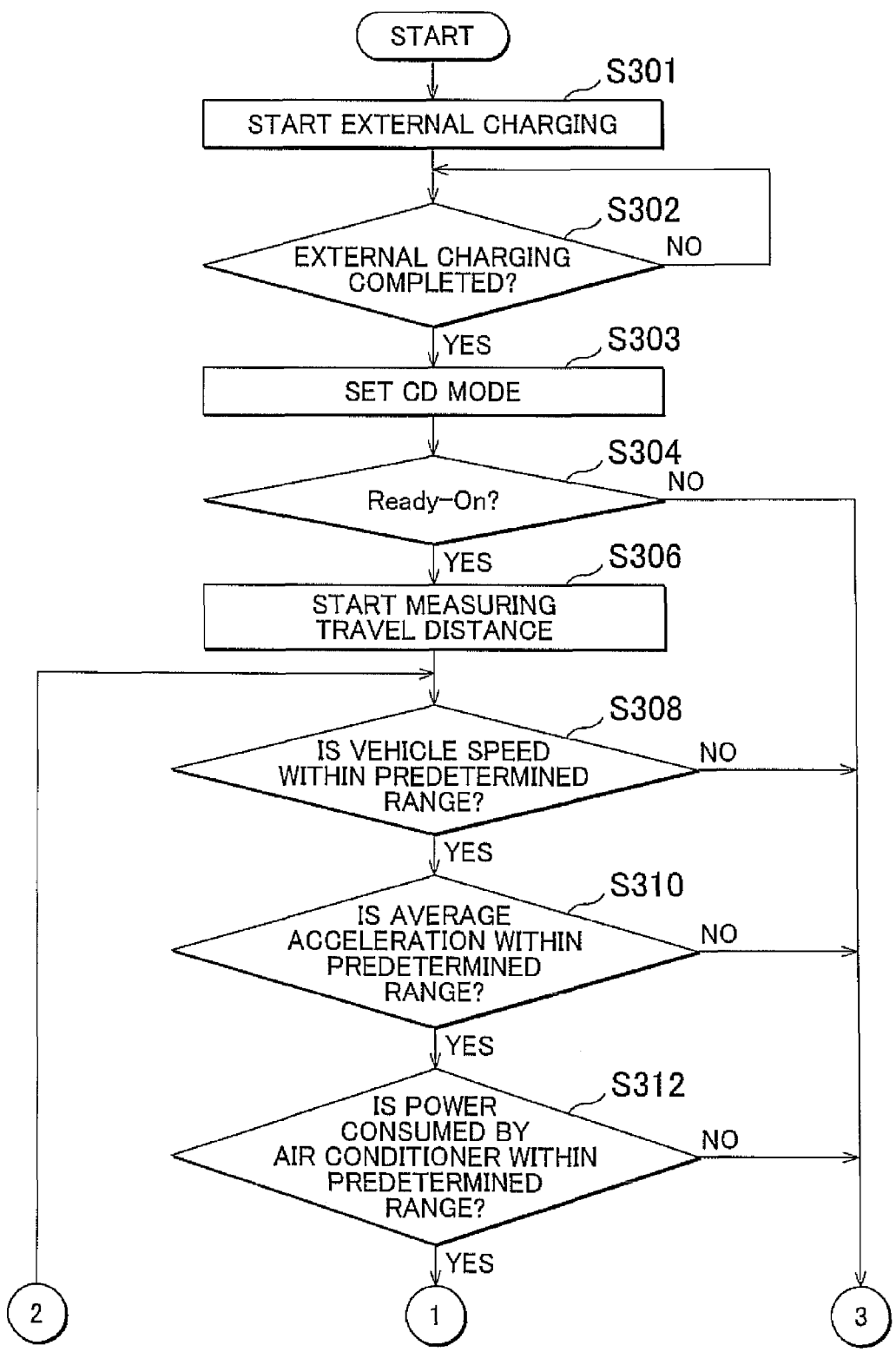
FIGS. 15A and 15B are flowcharts showing a control structure of a program related to the determination regarding degradation of a battery that is executed by a control apparatus according to a modification of the third embodiment of the invention.
Figure 15B:
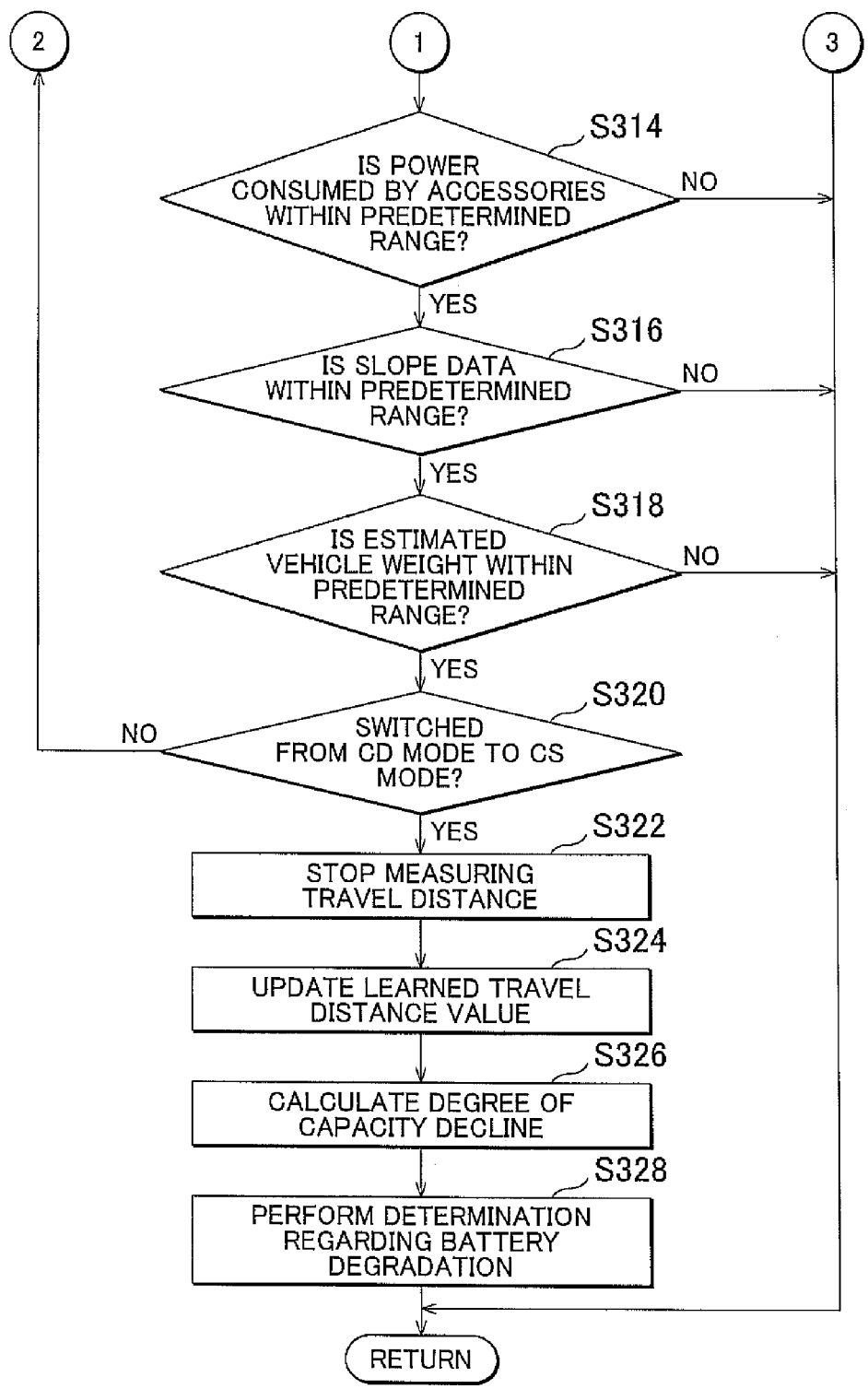

FIGS. 15A and 15B are flowcharts showing a control structure of a program related to the determination regarding degradation of the battery 10 that an ECU 15B according to a modification of the third embodiment of the invention. A process routine shown by this flowchart which branches from a main routine is executed at every predetermined time or every time a predetermined condition is satisfied.

Referring to FIG. 15A, steps S301 to S306 are the same as the steps S201 to S206 of the third embodiment, and their descriptions will not be repeated.

In S308, the ECU 15B determines whether the vehicle speed of the hybrid vehicle 100 is within a predetermined range. If an affirmative determination is made in this step (YES in S308), the process proceeds to S310.

In S310, the ECU 15B determines whether the average acceleration of the hybrid vehicle 100 is within a predetermined range. If an affirmative determination is made in this step (YES in S310), the process proceeds to S312.

In S312, the ECU 15B determines whether the electric power consumed by the electric air conditioner mounted in the hybrid vehicle 100 is within a predetermined range. If an affirmative determination is made in this step (YES in S312), the process proceeds to S314 (see FIG. 15B).

In S314, the ECU 15B determines whether the electric power consumed by the accessory loads mounted in the hybrid vehicle 100 is within a predetermined range. If an affirmative determination is made in this step (YES in S314), the process proceeds to S316.

In S316, the ECU 15B determines whether the slope data of the hybrid vehicle 100 is within a predetermined range. The slope data is calculated in the same manner as in S216. If an affirmative determination is made in this step (YES in S316), the process proceeds to S318.

In S318, the ECU 15B determines whether the estimated weight of the hybrid vehicle 100 is within a predetermined range. The weight of the hybrid vehicle 100 is calculated in the same manlier as in S218. If an affirmative determination is made in this step (YES in S318), the process proceeds to S320.

Incidentally, the predetermined ranges mentioned in S308 to S318 are determined so that a certain precision of the determination regarding degradation of the battery 10 and a certain frequency of occurrence of detection of the degradation thereof can be secured.

In S320, the ECU 15B determines whether the drive mode has switched from the CD mode to the CS mode. If an affirmative determination is made in this step (YES in S320), the process proceeds to S322. On the other hand, if a negative determination is made in S320 (NO in S320), the process returns to S308.

In S322, the ECU 15B stops measuring the travel distance of the hybrid vehicle 100.

Subsequently in S324, the ECU 15B updates the learned travel distance value on the basis of the actual travel distance. It is to be noted herein that the ECU 15B may update the learned travel distance value by summing the learned travel distance value stored in the memory and the actual travel distance at predetermined proportions.

Subsequently in S326, the ECU 15B calculates the degree of capacity decline of the battery 10. The degree of capacity decline is a proportion of the learned travel distance value to the assumed-for-new-car travel distance found beforehand.

Step S328 is the same as step S30 in the first embodiment, and therefore the description thereof will not be repeated. As in the above, in the modification of the third embodiment, the ECU 15B achieves improved detection accuracy by limiting the ranges of vehicle speed, the average acceleration, the electric power consumption, the slope data and the vehicle weight of the hybrid vehicle 100 that are used for degradation determination.

Fourth Embodiment

A fourth embodiment of the invention is different from the first embodiment in that instead of the integrated current value during the traveling of the vehicle, the charging time during the external charging is used as a basis for performing determination regarding degradation of the battery 10. Due to the use of charging time during the external charging, the fourth embodiment is able to restrain the influence that the tolerances of the electric current sensor and the voltage sensor have on detection accuracy.

Figure 16:
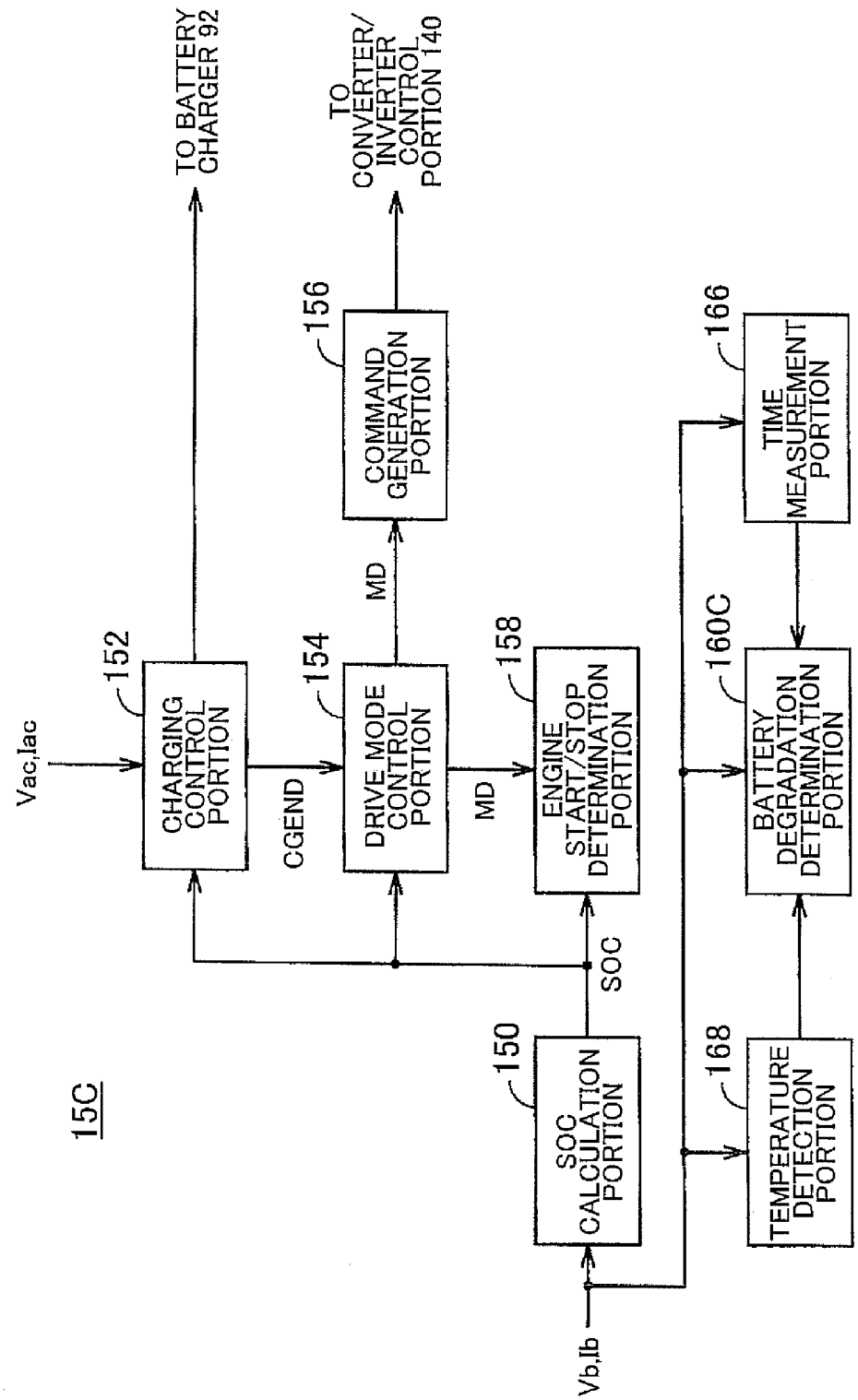
FIG. 16 is a functional block diagram of a control apparatus according to a fourth embodiment of the invention.

FIG. 16 is a functional block diagram of an ECU 15C according to the fourth embodiment of the invention. FIG. 16 is different from FIG. 2 in that the ECU 15C according to the fourth embodiment is not provided with either the current detection portion 162 or the current integration portion 164, and in that a battery degradation determination portion 160C is different from the battery degradation determination portion 160 of the ECU 15 shown in FIG. 2.

The battery degradation determination portion 160C receives the time measured by the time measurement portion 166 and the temperature detected by the temperature detection portion 168. The battery degradation determination portion 160C performs determination regarding degradation of the battery 10 on the basis of the amount of time needed for the external charging of the battery 10. Concretely, the battery degradation determination portion 160C measures the time from when during external charging, the open-circuit voltage of the battery 10 becomes higher than a predetermined measurement start voltage until when, during the external charging, the open-circuit voltage of the battery 10 becomes higher than a predetermined measurement end voltage. The battery degradation determination portion 160C calculates an average value of the temperature of the battery 10 occurring during the time measurement.

The battery degradation determination portion 160C updates a learned charging time value on the basis of the average electric power value of the battery 10 and the average temperature value of the battery 10. The battery degradation determination portion 160C stores learned charging time values corresponding to predetermined ranges of the temperature and to predetermined ranges of the electric power as shown in FIG. 17, in a memory provided in the ECU 15C. For example, if the calculated average temperature of the battery 10 falls in a temperature range A1 and the calculated average electric power of the battery 10 falls in an electric power range I1, a learned charging time value J11 corresponding to the temperature range A1 and to the electric power range I1 is updated on the basis of the measured time. It is to be noted herein that the battery degradation determination portion 160C may update the learned charging time value stored in the memory by summing the learned charging time value and the presently measured time at predetermined proportions.

The battery degradation determination portion 160C, similar to the battery degradation determination portion 160, calculates a degree of capacity decline of the battery 10 from the learned charging time value, and accordingly performs determination regarding degradation of the battery 10.

Figure 18A:
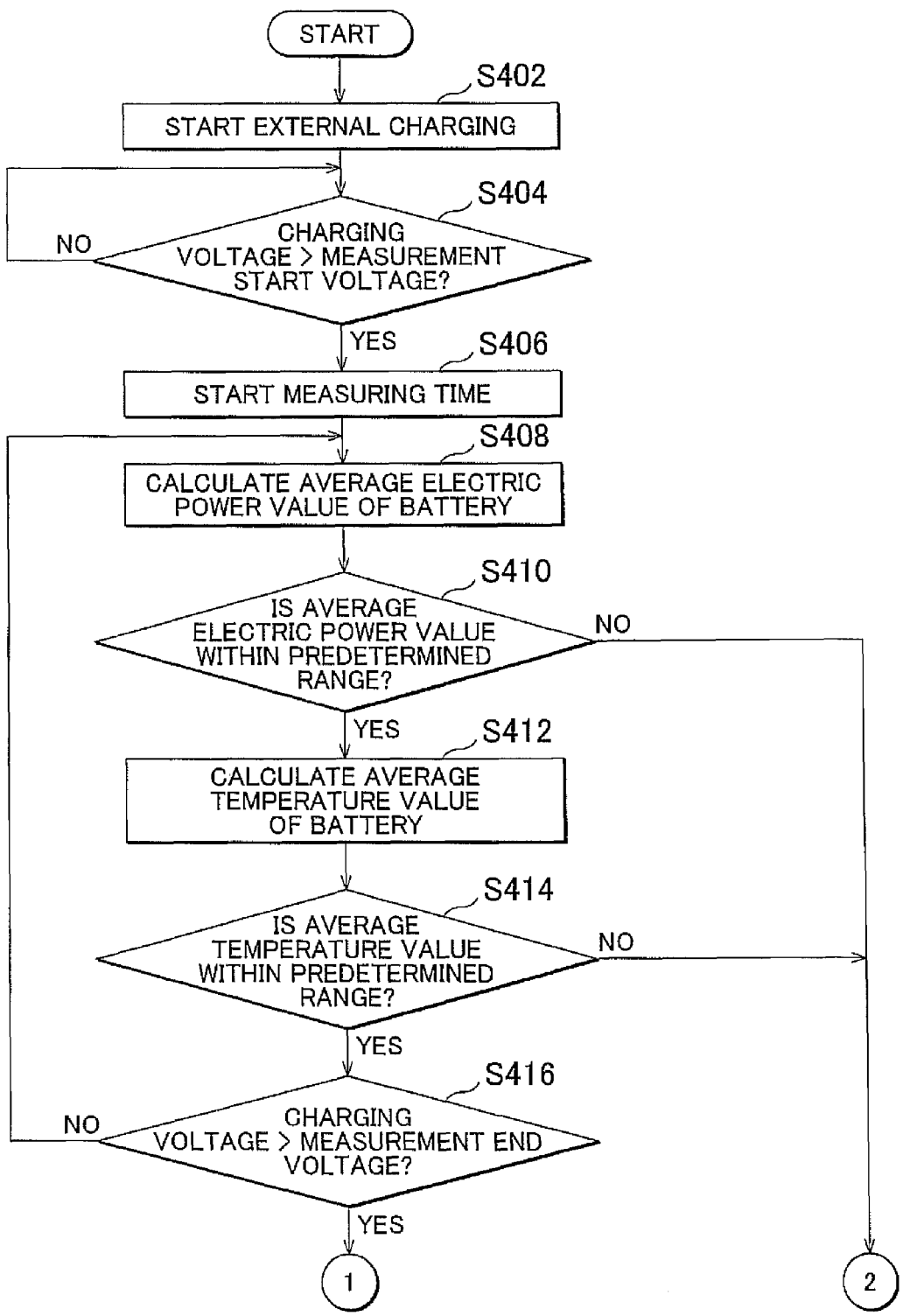
FIGS. 18A and 18B are flowcharts showing a control structure of a program related to the determination regarding degradation of a battery that is executed by the control apparatus according to the fourth embodiment of the invention.
Figure 18B:
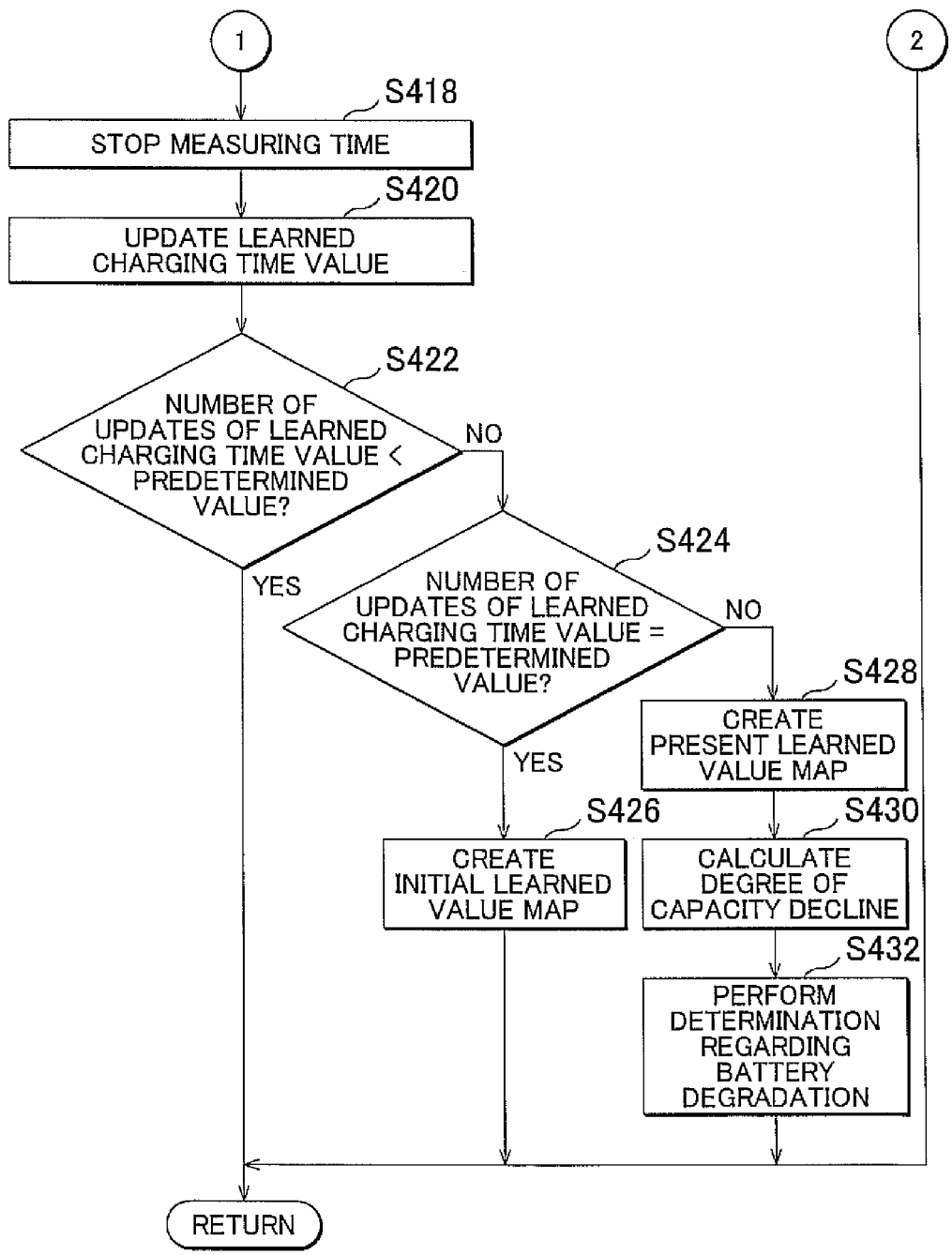

FIGS. 18A and 18B are flowcharts showing a control structure of a program related to the determination regarding degradation of the battery 10 executed by the ECU 15C according to the fourth embodiment of the invention. A process routine shown by this flowchart which branches from a main routine is executed at every predetermined time or every time a predetermined condition is satisfied.

Referring to FIG. 18A, in S402, the ECU 15C, upon receiving a charging request from a user, starts the external charging.

In S404, the ECU 15C determines whether the open-circuit voltage of the battery 10 is higher than the predetermined measurement start voltage. At this time, the open-circuit voltage of the battery 10 is calculated by adding a charging polarization value to a closed-circuit voltage value measured by a voltage sensor provided for the battery 10. The ECU 15C pre-stores charging polarization values as a map corresponding to predetermined ranges of the charging electric power and to predetermined ranges of the battery temperature, in a memory. Incidentally, instead of the open-circuit voltage of the battery 10, either the SOC or the closed-circuit voltage during the charging may be used to perform the aforementioned determination. If an affirmative determination is made in this step (YES in S404), the process proceeds to S406. If a negative determination is made in this step (NO in S404), the charging is continued until the voltage of the battery 10 becomes higher than the predetermined measurement start voltage.

In S406, the ECU 15C starts to measure time. Subsequently in S408, the ECU 15C calculates an average electric power value of the battery 10. Subsequently in S410, the ECU 15C determines whether the average electric power value calculated in S408 is within a predetermined range. If an affirmative determination is made in this step (YES in S410), the process proceeds to S412.

In S412, the ECU 15C calculates an average temperature value of the battery 10. Subsequently in S414, the ECU 15C determines whether the average temperature value calculated in S412 is within a predetermined range. If an affirmative determination is made in this step (YES in S414), the process proceeds to S416.

In S416, the ECU 15C determines whether the open voltage of the battery 10 is higher than the predetermined measurement end voltage. If an affirmative determination is made in this step (YES in S416), the process proceeds to S418 (see FIG. 18B). If a negative determination is made in this step (NO in S416), the process returns to S408.

Description will be further made with reference to FIG. 18B. In S418, the ECU 15C stops measuring time. Subsequently in S420, the ECU 15C updates a learned charging time value on the basis of the average electric power value of the battery 10 and the average temperature value of the battery 10. The ECU 15C stores learned charging time values corresponding to predetermined ranges of the temperature and to predetermined ranges of the electric power as shown in FIG. 17, in the memory of the ECU 15C. For example, if the calculated average temperature of the battery 10 falls in a temperature range A1 and the calculated average electric power of the battery 10 falls in an electric power range I1, a learned charging time value J11 corresponding to the temperature range A1 and to the electric power range I1 is updated on the basis of the measured time. At this time, the learned charging time value stored in the memory may be updated by summing the learned charging time value and the presently measured time at predetermined proportions.

Steps of S422 to S432 are the same as steps S20 to S30 in the first embodiment, and therefore the descriptions thereof will not be repeated.

As described above, in the fourth embodiment, the ECU 15C performs determination regarding degradation of the battery 10 on the basis of the time needed for the charging. This restrains the influence of the tolerances of the electric current sensor and the voltage sensor on detection accuracy. Furthermore, by enhancing the accuracy of the time measurement portion, the degradation determination can be performed more accurately.

Fifth Embodiment

The fifth embodiment of the invention is different from the first embodiment in that degradation determination is performed by using a plurality of factors of degradation of the battery 10 instead of the integrated current value during the driving of the vehicle. Since the fifth embodiment performs determination regarding degradation of the battery 10 by using the factors of degradation of the battery 10, the fifth embodiment is able to restrain the influence of individual product differences on detection accuracy.

Figure 19:
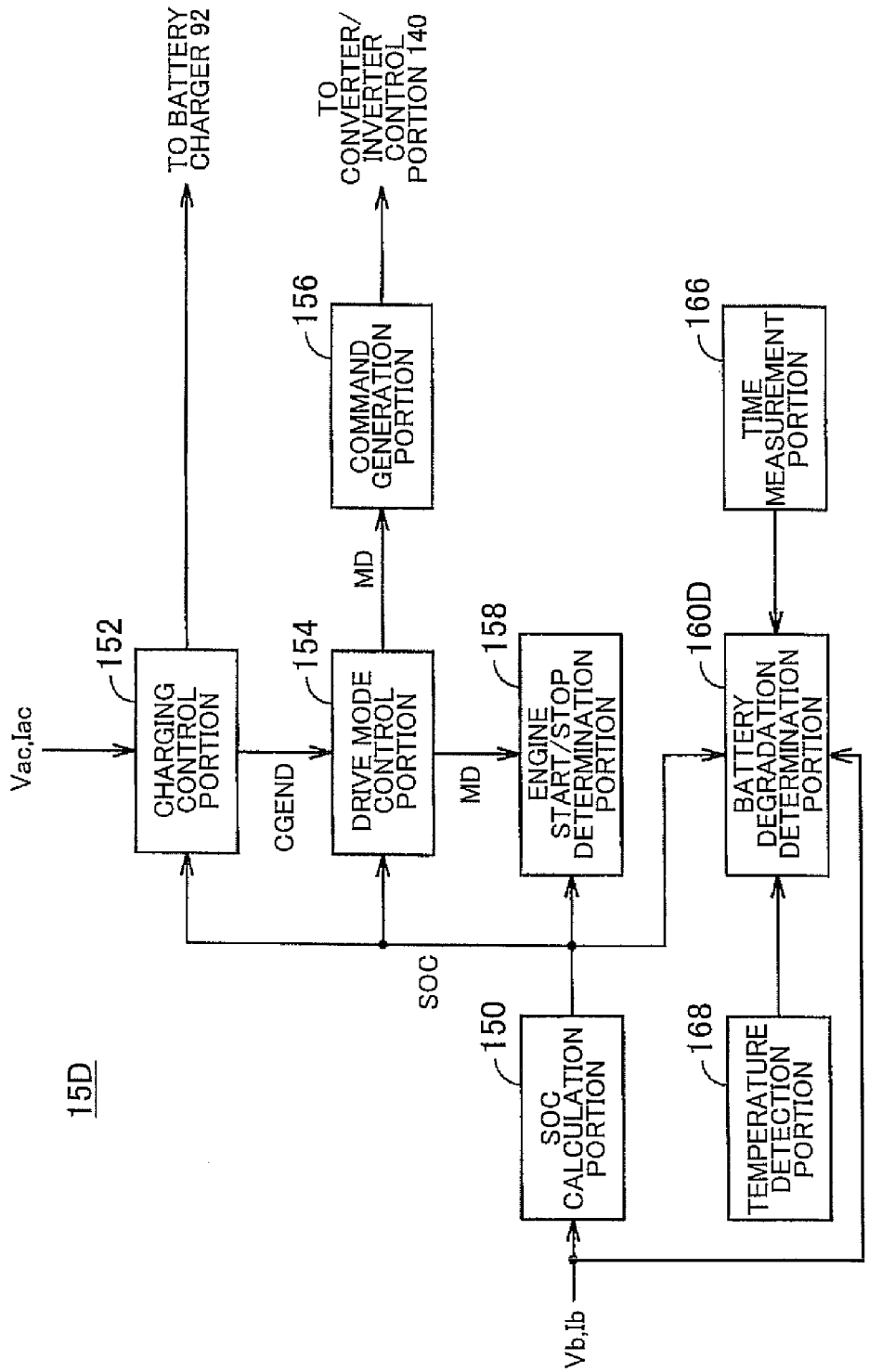
FIG. 19 is a functional block diagram of a control apparatus according to a fifth embodiment of the invention.

FIG. 19 is a functional block diagram of an ECU 15D according to the fifth embodiment of the invention. FIG. 19 is different from FIG. 2 in that the ECU 15D according to the fifth embodiment is not provided with either the current detection portion 162 or the current integration portion 164, and in that a battery degradation determination portion 160D of the ECU 15D is different from the battery degradation determination portion 160 of the ECU 15 shown in FIG. 2.

The battery degradation determination portion 160D receives the time measured by the time measurement portion 166 and the temperature detected by the temperature detection portion 168. The battery degradation determination portion 160D receives the SOC calculated by the SOC calculation portion 150. The battery degradation determination portion 160D performs determination regarding degradation of the battery 10 on the basis of the electric current frequency product, the current squared frequency product, the temperature frequency product and the SOC frequency product Concretely, the battery degradation determination portion 160D calculates the degree of degradation based on the current frequency product of the battery 10. It is to be noted herein that the battery degradation determination portion 160D stores total amounts of time corresponding to predetermined ranges of current as shown in FIG. 20. Furthermore, the battery degradation determination portion 160D prepares degradation coefficients corresponding to the predetermined ranges of current beforehand as shown in FIG. 21. Then, the battery degradation determination portion 160D calculates the degree of degradation for each of the predetermined ranges of current by multiplying one of the total amounts of time that corresponds to that predetermined range by one of the degradation coefficients that corresponds to the predetermined range, as shown in FIG. 22. The battery degradation determination portion 160D calculates the degree of degradation based on the current frequency product of the battery 10 by totaling all the degrees of degradation calculated corresponding to the predetermined ranges of current. For example, a degree of degradation N1 in a current range R1 is obtained by multiplying a total amount of time M1 by a degradation coefficient L1. Furthermore, the degree of degradation based on the current frequency product is obtained by totaling the degrees of degradation N1 to N3. At this time, the battery degradation determination portion 160D calculates degrees of degradation K1 to K3 based on the current frequency product, for a driving state, a charging state and a left-standing state.

The battery degradation determination portion 160D, similarly to the above-described manner, calculates degrees of degradation K4 to K6 based on the current squared frequency product, degrees of degradation K7 to K9 based on the temperature frequency product, and degrees of degradation K10 to K12 based on the SOC frequency product, for the driving state, the charging state and the left-standing state.

The battery degradation determination portion 160D calculates the degree of capacity decline of the battery 10. The degree of capacity decline is calculated by totaling the calculated degrees of degradation K1 to K12. The battery degradation determination portion 160D, similar to the battery degradation determination portion 160, performs determination regarding degradation of the battery 10 on the basis of the degree of capacity decline.

Figure 24:
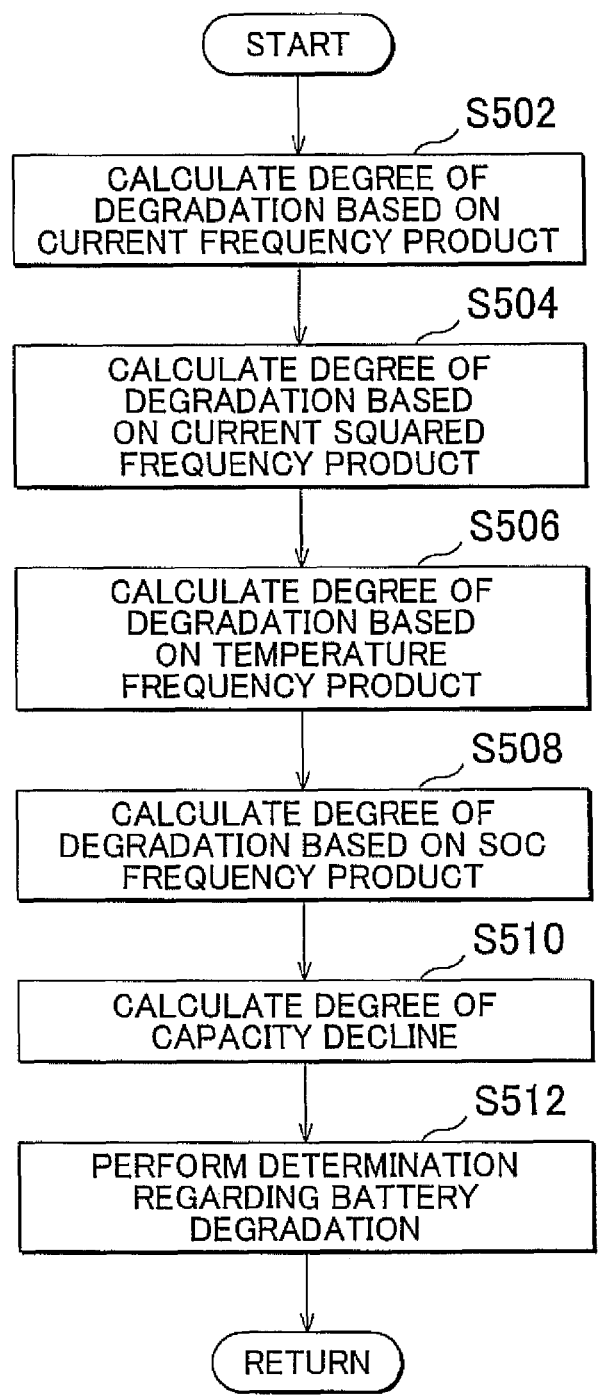
FIG. 24 is a flowchart showing a control structure of a program related to the determination regarding degradation of a battery that is executed by the control apparatus according to the fifth embodiment of the invention.

FIG. 24 is a flowchart showing a control structure of a program related to the determination regarding degradation of the battery 10 that is executed by the ECU 15D according to the fifth embodiment of the invention. A process routine shown by this flowchart which branches from a main routine is executed at every predetermined time or every time a predetermined condition is satisfied.

Referring to FIG. 24, when the process starts, the ECU 15D calculates in S502 a degree of degradation of the battery 10 based on the current frequency product. It is to be noted herein that the ECU 15D stores total amounts of time corresponding to the predetermined current ranges. Furthermore, the ECU 15D prepares degradation coefficients corresponding to the current ranges in advance as shown in FIG. 21. The ECU 15D calculates the degree of degradation for each current range by multiplying a corresponding one of the total amounts of time by a corresponding one of the degradation coefficients as shown in FIG. 22. ECU 15D calculates the degree of degradation of the battery 10 based on the current frequency product by totaling all the degrees of degradation calculated for the current ranges. For example, the degree of degradation N1 in the current range R1 is obtained by multiplying the total amount of time M1 by the degradation coefficient L1. Furthermore, the degree of degradation based on the current frequency product is obtained by totaling the degrees of degradation N1 to N3. At this time, the ECU 15D calculates the degrees of degradation K1 to K3 based on the current frequency product, for the driving state, the charging state and the left-standing state, respectively, as shown in FIG. 23.

Subsequently in S504, the ECU 15D calculates a degree of degradation of the battery 10 based on the current squared frequency product. It is to be noted herein that the ECU 15D stores total amounts of time corresponding to predetermined ranges of current squared, in a manner similar to that shown in FIG. 20. Furthermore, the ECU 15D prepares degradation coefficients corresponding to the current squared ranges in advance, in a manner similar to that shown in FIG. 21. The ECU 15D calculates a degree of degradation for each current squared range by multiplying a corresponding one of the total amounts of time by a corresponding one of the degradation coefficients, in a manner similar to that shown in FIG. 22. ECU 15D calculates the degree of degradation of the battery 10 based on the current squared frequency product by totaling all the degrees of degradation calculated for the current squared ranges. At this time, the ECU 15D calculates the degrees of degradation K4 to K6 based on the current frequency product, for the driving state, the charging state and the left-standing state, respectively, as shown in FIG. 23.

Subsequently in S506, the ECU 15D calculates a degree of degradation of the battery 10 based on the temperature frequency product. It is to be noted herein that the ECU 15D stores total amounts of time corresponding to predetermined ranges of temperature, in a manner similar to that shown in FIG. 20. Furthermore, the ECU 15D prepares degradation coefficients corresponding to the temperature ranges in advance, in a manner similar to that shown in FIG. 21. The ECU 15D calculates a degree of degradation for each temperature range by multiplying a corresponding one of the total amounts of time by a corresponding one of the degradation coefficients, in a manner similar to that shown in FIG. 22. ECU 15D calculates the degree of degradation of the battery 10 based on the temperature frequency product by totaling all the degrees of degradation calculated for the temperature ranges. At this time, the ECU 15D calculates the degrees of degradation K7 to K9 based on the temperature frequency product, for the driving state, the charging state and the left-standing state, respectively, as shown in FIG. 23.

Subsequently in S508, the ECU 15D calculates a degree of degradation of the battery 10 based on the SOC frequency product. It is to be noted herein that the ECU 15D stores total amounts of time corresponding to predetermined ranges of SOC, in a manner similar to that shown in FIG. 20. Furthermore; the ECU 15D prepares degradation coefficients corresponding to the SOC ranges in advance, in a manner similar to that shown in FIG. 21. The ECU 15D calculates the degree of degradation for each SOC range by multiplying a corresponding one of the total amounts of time by a corresponding one of the degradation coefficients, in a manner similar to that shown in FIG. 22. ECU 15D calculates the degree of degradation of the battery 10 based on the SOC frequency product by totaling all the degrees of degradation calculated for the SOC ranges. At this time, the ECU 15D calculates the degrees of degradation K10 to K12 based on the SOC frequency product, for the driving state, the charging state and the left-standing state, respectively, as shown in FIG. 23.

Subsequently in S510, the ECU 15D the degree of capacity decline of the battery 10. The degree of capacity decline is calculated by totaling the degrees of degradation K1 to K12 calculated in S502 to S508.

Step S512 is the same as step S30 in the first embodiment, and therefore the description thereof will not be repeated. As in the above, in the fifth embodiment, since the determination regarding degradation of the battery 10 is performed by using a plurality of factors of the degradation, the influence of individual product differences on detection accuracy can be restrained.

Modification

A modification of the fifth embodiment of the invention, compared with the fifth embodiment, differs in the method of performing degradation determination by using a plurality of factors. This modification of the fifth embodiment is also able to achieve substantially the same effects as the fifth embodiment.

Figure 25:
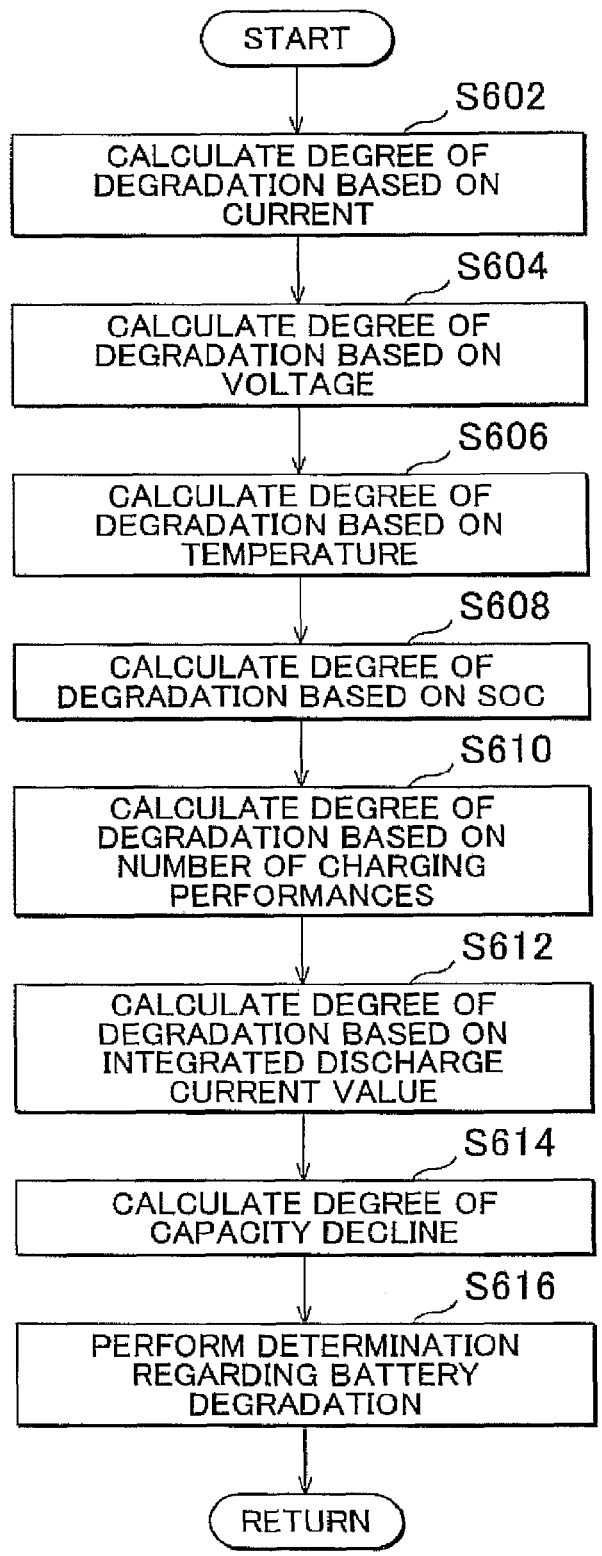
FIG. 25 is a flowchart showing a control structure of a program related to the determination regarding degradation of a battery that is executed by a control apparatus according to a modification of the fifth embodiment of the invention.

FIG. 25 is a flowchart showing a control structure of a program related to the determination regarding degradation of the battery 10 that is executed by an ECU 15D according to the modification of the fifth embodiment of the invention. A process routine shown by this flowchart which branches from a main routine is executed at every predetermined time or every time a predetermined condition is satisfied.

Referring to FIG. 25, when the process starts, the ECU 15D calculates in S602 the degree of degradation of the battery 10 based on current. Concretely, the ECU 15D measures the charging/discharging current of the battery 10 at every predetermined time, and stores the frequencies of occurrence corresponding to predetermined ranges of current as shown in FIG. 26. Besides, ECU 15D prepares damage coefficients corresponding to the current ranges beforehand as shown in FIG. 26. Then, the ECU 15D calculates a degradation point for each current range by multiplying a corresponding one of the frequencies of occurrence by a corresponding one of the damage coefficients as shown in FIG. 26. The ECU 15D calculates the degree of degradation of the battery 10 based on current by referring to a prepared-beforehand map on the basis of a sum total of all the degradation points calculated separately for the current ranges. For example, a degradation point Q1 in the current range R1 is obtained by multiplying a frequency of occurrence O1 by a damage coefficient P1. Furthermore, the degree of degradation based on current is obtained by multiplying the sum total of the degradation points Q1 to Q3 by an adaptation value prepared beforehand. Incidentally, as for the damage coefficients and the map, values obtained beforehand by a physical property test of the battery is used.

Subsequently in S604, the ECU 15D calculates the degree of degradation of the battery 10 based on voltage. Concretely, the ECU 15D measures the maximum voltage or minimum voltage of the battery 10 at every predetermined time, and stores the frequencies of occurrence corresponding to predetermined ranges of voltage in a manner similar to that shown in FIG. 26. Besides, ECU 15D prepares damage coefficients corresponding to the voltage ranges beforehand in a manner similar to that shown in FIG. 26. Then, the ECU 15D calculates a degradation point for each voltage range by multiplying a corresponding one of the frequencies of occurrence by a corresponding one of the damage coefficients in a manner similar to that shown in FIG. 26. The ECU 15D calculates the degree of degradation of the battery 10 based on voltage by referring to a prepared-beforehand map on the basis of a sum total of all the degradation points calculated separately for the voltage ranges.

Subsequently in S606, the ECU 15D calculates the degree of degradation of the battery 10 based on temperature. Concretely, the ECU 15D measures the highest temperature of the battery 10 at every predetermined time, and stores the frequencies of occurrence corresponding to predetermined ranges of temperature in a manner similar to that shown in FIG. 26. Besides, ECU 15D prepares damage coefficients corresponding to the temperature ranges beforehand in a manner similar to that shown in FIG. 26. Then, the ECU 15D calculates a degradation point for each temperature range by multiplying a corresponding one of the frequencies of occurrence by a corresponding one of the damage coefficients in a manner similar to that shown in FIG. 26. The ECU 15D calculates the degree of degradation of the battery 10 based on voltage by referring to a prepared-beforehand map on the basis of a sum total of all the degradation points calculated for the temperature ranges.

Subsequently in S608, the ECU 15D calculates the degree of degradation of the battery 10 based on SOC. Concretely, the ECU 15D measures the SOC of the battery 10 at every predetermined time, and stores the frequencies of occurrence corresponding to predetermined ranges of SOC in a manner similar to that shown in FIG. 26. Besides, ECU 15D prepares damage coefficients corresponding to the SOC ranges beforehand in a manner similar to that shown in FIG. 26. Then, the ECU 15D calculates a degradation point for each SOC range by multiplying a corresponding one of the frequencies of occurrence by a corresponding one of the damage coefficients in a manner similar to that shown in FIG. 26. The ECU 15D calculates the degree of degradation of the battery 10 based on SOC by referring to a prepared-beforehand map on the basis of a sum total of all the degradation points calculated for the SOC ranges.

Subsequently in S610, the ECU 15D calculates the degree of degradation of the battery 10 based on the number of times that the battery 10 has been charged. Concretely, the ECU 15D stores the number of times that the external charging with a change in the SOC that is greater than a predetermined amount has been performed. The ECU 15D prepares the degrees of degradation corresponding to the numbers of times that the external charging has been performed, beforehand as a map. The ECU 15D calculates the degree of degradation based on the number of times that the aforementioned charging of the battery has been performed, by referring to a map on the basis of the number of times that the charging has been performed.

Subsequently in S612, the ECU 15D calculates the degree of degradation of the battery 10 based on the integrated discharging current value. Concretely, the ECU 15D integrates the current that the battery 10 discharges. The ECU 15D prepares the degrees of degradation for predetermined ranges of discharging current beforehand as a map. The ECU 15D calculates the degree of degradation of the battery 10 based on the integrated discharging current value by referring to a map on the basis of the discharging current.

Subsequently in S614, the ECU 15D calculates the degree of capacity decline of the battery 10. The degree of capacity decline is calculated by totaling the degrees of degradation calculated in S602 to S612.

Step S616 is the same as step S30 in the first embodiment, and therefore the description thereof will not be repeated. As in the above, the modification of the fifth embodiment, too, is able to achieve substantially the same effects as the fifth embodiment.

Incidentally, the foregoing embodiments have been described in conjunction with a series/parallel type hybrid vehicle in which the motive power of the engine ENG can be split by the differential gear 40 to the driving wheels 50 and to the motor-generators MG1 and MG2. However, this invention is also applicable to other types of hybrid vehicles. That is, the invention is also applicable to, for example, a so-called series type hybrid vehicle that uses the engine ENG only for the purpose of driving the motor-generator MG1, and uses only the motor-generator MG2 to generate drive force for the vehicle, a hybrid vehicle in which, of the kinetic energy generated by the engine ENG, only regenerative energy is recovered as electric energy, a motor-assist type hybrid vehicle in which an engine is used as a main drive force source and an electric motor assists according to the need, etc.

Although the foregoing embodiments have been described in conjunction with the battery 10, a capacitor may also be used instead of the battery 10.

In the foregoing embodiments, the battery 10 corresponds to an embodiment of the "electricity storage apparatus" in the invention, and the engine ENG corresponds to an embodiment of the "internal combustion engine" in the invention. Furthermore, the motor-generators MG1 and MG2 correspond to an embodiment of the "electric motor" in the invention, and the battery charger 92 corresponds to an embodiment of the "charger apparatus" in the invention. Still further, the CD mode corresponds to an embodiment of the "first mode" in the invention, and the CS mode corresponds to an embodiment of the "second mode" in the invention. Further, the battery degradation determination portion 160 corresponds to an embodiment of the "determination portion" in the invention.

The embodiments disclosed herein should be considered as being illustrative and not restrictive in all respects. The scope of the invention is shown not by the foregoing descriptions of the embodiment but by the claims for patent, and and is intended to cover all the modifications within the meaning and scope equivalent to the claims for patent.

What is claimed is:

1. A control apparatus for a hybrid vehicle that includes: an internal combustion engine, an electrical storage apparatus, at least one electric motor that has an electricity generation function of being driven by the internal combustion engine so as to supply electric power to the electrical storage apparatus and a function of generating drive force, and a charger apparatus configured so as to be supplied with electric power from an electric power supply provided outside the hybrid vehicle and charge the electrical storage apparatus, and that is able to drive with at least two drive modes that include a first mode in which priority is given to a drive with the internal combustion engine stopped and with only the electric motor used as a drive force source of the hybrid vehicle, and a second mode in which the internal combustion engine is operated and a state quantity that indicates state of charge of the electrical storage apparatus is kept at a predetermined target the control apparatus comprising:
an electronic control unit configured to execute:
setting the drive mode to the first mode after charging of the electrical storage apparatus by the charger apparatus ends as the state of charge of the electrical storage apparatus reaches a first predetermined range;
switching the drive mode to the second mode if, after the hybrid vehicle starts driving in the first mode, the state of charge of the electrical storage apparatus declines to a second predetermined range that is lower than the first predetermined range; and
determining that the electrical storage apparatus has degraded when a degree of a capacity decline of the electrical storage apparatus is lower than a predetermined threshold, the degradation of the electric storage apparatus is a decline in a full charge capacity of the electric storage apparatus, the degree of the capacity decline is calculated based on data that is collected from a time when the hybrid vehicle starts driving in the first mode until a time when the drive mode is switched to the second mode, the predetermined threshold is different than the first predetermined range and the second predetermined range.

2. The control apparatus according to claim 1, wherein:
the first predetermined range of the state of charge includes a fully charged state of the electrical storage apparatus; and
the electronic control unit determines the degradation of the electrical storage apparatus based on data collected from when the electrical storage apparatus is in the fully charged state until when the drive mode is switched from the first mode to the second mode.

3. The control apparatus according to claim 2, wherein:
the data is an integrated current value obtained by integrating input/output current of the electrical storage apparatus from when the electrical storage apparatus is in the fully charged state until when the drive mode is switched from the first mode to the second mode.

4. The control apparatus according to claim 3, wherein:
the electronic control unit determines the degradation of the electrical storage apparatus based on amount of decline of the integrated current value from an initial integrated current value measured during an initial state occurring before the electrical storage apparatus degrades.

5. The control apparatus according to claim 2, wherein:
the data is an integrated electric power value obtained by integrating input/output electric power of the electrical storage apparatus from when the electrical storage apparatus is in the fully charged state until when the drive mode is switched from the first mode to the second mode.

6. The control apparatus according to claim 5, wherein:
the electronic control unit determines the degradation of the electrical storage apparatus based on amount of decline of the integrated electric power value from an initial integrated electric power value measured during an initial state occurring before the electrical storage apparatus degrades.

7. The control apparatus according to claim 2, wherein:
the data is travel distance that the hybrid vehicle drives from when the electrical storage apparatus is in the fully charged state until when the drive mode is switched from the first mode to the second mode.

8. The control apparatus according to claim 7, wherein:
the electronic control unit determines the degradation of the electrical storage apparatus based on amount of decline of the travel distance from an initial travel distance measured during an initial state occurring before the electrical storage apparatus degrades.

9. The control apparatus according to claim 1, wherein:
the electronic control unit determines the degradation of the electrical storage apparatus based on the data commensurate with temperature of the electrical storage apparatus.

10. The control apparatus according to claim 1, wherein:
the electronic control unit determines the degradation of the electrical storage apparatus based on the data commensurate with time of drive in the first mode.

11. The control apparatus according to claim 1, wherein:
the electronic control unit continues determining the degradation of the electrical storage apparatus if the internal combustion engine operates while the drive mode is the first mode.

12. The control apparatus according to claim 1, wherein:
the electronic control unit stops determining the degradation of the electrical storage apparatus if the internal combustion engine operates while the drive mode is the first mode.

13. A control method for a hybrid vehicle that includes: an internal combustion engine, an electronic control unit, an electrical storage apparatus, at least one electric motor that has an electricity generation function of being driven by the internal combustion engine so as to supply electric power to the electrical storage apparatus and a function of generating drive force, and a charger apparatus configured to be supplied with electric power from an electric power supply provided outside the hybrid vehicle and charge the electrical storage apparatus, and that is able to drive with a first mode in which priority is given to a drive with the internal combustion engine stopped and with only the electric motor used as a drive force source of the hybrid vehicle, and a second mode in which the internal combustion engine is operated and a state quantity that indicates state of charge of the electrical storage apparatus is kept at a predetermined target,
the control method comprising:
setting, by the electronic control unit, the drive mode to the first mode after charging of the electrical storage apparatus by the charger apparatus ends as the state of charge of the electrical storage apparatus reaches a first predetermined range;
switching, by the electronic control unit, the drive mode to the second mode if, after the hybrid vehicle starts driving in the first mode, the state of charge of the electrical storage apparatus declines to a second predetermined range that is lower than the first predetermined range;
performing, by the electronic control unit, determination regarding degradation of the electrical storage apparatus based on data collected while the hybrid vehicle is driving in the first mode; and
determining that the electrical storage apparatus has degraded when a degree of a capacity decline of the electrical storage apparatus is lower than a predetermined threshold, the degradation of the electric storage apparatus is a decline in a full charge capacity of the electric storage apparatus, the degree of the capacity decline is calculated based on data that is collected from a time when the hybrid vehicle starts driving in the first mode until a time when the drive mode is switched to the second mode, the predetermined threshold is different than the first predetermined range and the second predetermined range.

14. The control method according to claim 13 wherein:
the first predetermined range of the state of charge includes a fully charged state of the electrical storage apparatus; and
the determination regarding degradation of the electrical storage apparatus is performed, by the electronic control unit, based on data collected from when the electrical storage apparatus is in the fully charged state until when the drive mode is switched from the first mode to the second mode.

15. The control apparatus according to claim 14, wherein:
the data is an integrated current value obtained by integrating input/output current of the electrical storage apparatus from when the electrical storage apparatus is in the fully charged state until when the drive mode is switched from the first mode to the second mode, and the determination regarding degradation of the electrical storage apparatus is performed, by the electronic control unit, based on amount of decline of the integrated current value from an initial integrated current value measured during an initial state occurring before the electrical storage apparatus degrades.

16. The control apparatus according to claim 14, wherein:
the data is an integrated electric power value obtained by integrating input/output electric power of the electrical storage apparatus from when the electrical storage apparatus is in the fully charged state until when the drive mode is switched from the first mode to the second mode, and the determination regarding degradation of the electrical storage apparatus is performed, by the electronic control unit, based on amount of decline of the integrated electric power value from an initial integrated electric power value measured during an initial state occurring before the electrical storage apparatus degrades.

17. The control apparatus according to claim 14, wherein:
the data is travel distance that the hybrid vehicle drives from when the electrical storage apparatus is in the fully charged state until when the drive mode is switched from the first mode to the second mode, and the determination regarding degradation of the electrical storage apparatus is performed, by the electronic control unit, based on amount of decline of the travel distance from an initial travel distance measured during an initial state occurring before the electrical storage apparatus degrades.

* * * * *